US007281320B2

(12) United States Patent
Sakaue et al.

(10) Patent No.: US 7,281,320 B2
(45) Date of Patent: Oct. 16, 2007

(54) WATERPROOF-SEAL INSERTING APPARATUS

(75) Inventors: Shigeru Sakaue, Hyogo (JP); Tetsuya Yano, Hyogo (JP); Tadashi Shimooku, Hyogo (JP); Hiroyuki Inoue, Hyogo (JP); Tadashi Taniguchi, Hyogo (JP)

(73) Assignee: ShinMaywa Industries, Ltd., Takarazuka-shi (JP)

( * ) Notice: Subject to any disclaimer, the term of this patent is extended or adjusted under 35 U.S.C. 154(b) by 361 days.

(21) Appl. No.: 11/067,752

(22) Filed: Mar. 1, 2005

(65) Prior Publication Data

US 2005/0202721 A1 Sep. 15, 2005

(30) Foreign Application Priority Data

Mar. 11, 2004 (JP) ............................ 2004-069134

(51) Int. Cl.
*B23P 19/00* (2006.01)
*H01R 13/40* (2006.01)

(52) U.S. Cl. ............................ 29/739; 29/740; 29/741; 29/743; 29/255; 29/272; 439/587

(58) Field of Classification Search .................. 29/739, 29/740, 743, 741, 760, 742, 255, 272; 439/584, 439/274, 275, 271; 271/38, 112
See application file for complete search history.

(56) References Cited

U.S. PATENT DOCUMENTS 2,976,199 A * 3/1961 Rand .......................... 156/163
4,515,507 A * 5/1985 Asai et al. .................... 29/740
6,241,554 B1 * 6/2001 Murakami et al. .......... 439/587
6,325,661 B1 * 12/2001 Tabata ........................ 439/459

FOREIGN PATENT DOCUMENTS

JP 11-345668 12/1999

* cited by examiner

*Primary Examiner*—A. Dexter Tugbang
*Assistant Examiner*—Tai Van Nguyen
(74) *Attorney, Agent, or Firm*—Oblon, Spivak, McClelland, Maier & Neustadt, P.C.

(57) ABSTRACT

A seal-feeding station includes a seal receiver (21) for receiving a waterproof seal (20) fed through a seal feeding tube (16) and a seal keeper (23) for keeping the waterproof seal (20) transferred from the seal receiver (21) in an electric-wire insertion position. The seal receiver (21) includes a slider board (27) which is supported slidably between a standby position and a transfer position and includes an acceptance hole (**27*b*) in which the waterproof seal (20) is fit in when the slider board (27) is in the standby position, and a push pin (38) which is movable forward and backward, is located so as to face the acceptance hole (27*b*) of the slider board (27) when the slider board (27) is in the transfer position, and moves forward to push the waterproof seal (20) fit in the acceptance hole (27*b*) and transfer the waterproof seal (20) to the seal keeper (23**).

15 Claims, 17 Drawing Sheets

WATERPROOF-SEAL INSERTING APPARATUS

BACKGROUND OF THE INVENTION

1. Field of the Invention

The present invention relates to a waterproof-seal inserting apparatus for applying a waterproof seal to an end portion of an electric wire.

2. Description of the Background Art

Conventionally, an apparatus for processing an electric wire, which applies a tube-shaped waterproof seal made of a rubber or the like to an end portion of the electric wire and crimps a terminal to the end portion of the electric wire, has been devised. The conventional apparatus for processing an electric wire includes a dimension measuring unit, a front cramp, a cutter unit, a rear cramp, a front seal-feeding mechanism, a front seal-inserting mechanism, a front terminal-crimping unit, a rear seal-feeding mechanism, a rear seal-inserting mechanism, a rear terminal-crimping unit, a front moving member, and a rear moving member, for example.

The conventional apparatus for processing an electric wire has a structure in which each of the seal-feeding mechanisms is placed on a separate stand different from a stand on which a body of the apparatus is placed, in order to allow stable feeding of waterproof seals and improve versatility in installation, in some cases. In the foregoing structure, waterproof seals are fed from the seal-feeding mechanisms to the seal-inserting mechanisms through seal feeding tubes using air which serves to feed waterproof seals ("feeding air") (see Japanese Patent Application Laid-Open No. 11-345668, which will be hereinafter referred to as "JP No. 11-3456668", for example).

Then, a predetermined amount of electric wire which is fed along a line for feeding an electric wire ("electric-wire feeding line") is grasped by the front cramp and the rear cramp. Subsequently, the electric wire is cut by the cutter unit, to be divided into two parts which are grasped by the front cramp and the rear cramp, respectively.

Next, one part out of the two parts of the electric wire which is grasped by the front cramp is moved to a position where the front seal-inserting mechanism is placed. The front seal-inserting mechanism receives waterproof seals which are sequentially fed from the front seal-feeding mechanism. In the position where the front seal-inserting mechanism is placed, an end portion of the one part of the electric wire is inserted into one of the waterproof seals received from the front seal-inserting mechanism, and is fitted in the waterproof seal, so that the waterproof seal is mounted to the end portion of the one part of the electric wire.

Thereafter, the one part of the electric wire is returned back to a position where the cutter unit is placed. In the position where the cutter unit is placed, a covering of a portion of the one part of the electric wire, which portion is located closer to an end than a portion mounted by the waterproof seal, is stripped off by the cutter unit, so that a core of the one part of the electric wire is exposed.

After the covering is stripped off, the one part of the electric wire is moved to a position where the front terminal-crimping unit is placed. In the position where the front terminal-crimping unit is placed, a terminal is crimped onto the portion whose covering has been stripped off, by the front terminal-crimping unit.

After the terminal is crimped onto the one part of the electric wire crimped, the one part of the electric wire is driven to be located to a position where the one part of the electric wire faces the cutter unit, by the front moving member. Then, a predetermined amount of electric wire is further fed in a predetermined direction along the electric-wire feeding line by the dimension measuring unit.

Thereafter, the electric wire which is further fed is grasped by the front cramp and the rear cramp, and cut by the cutter unit, to be divided into two parts grasped by the front cramp and the rear cramp, respectively. Thereafter, the same processes as described above are performed on an end portion of one part out of the two parts of the electric wire which is grasped by the front cramp, so that a terminal is crimped onto the one part of the electric wire.

On the other hand, the other part of the electric wire which is grasped by the rear cramp, is moved to a position where the rear seal-inserting mechanism is placed. The rear seal-inserting mechanism receives waterproof seals which are sequentially fed from the rear seal-feeding mechanism. In the position where the rear seal-inserting mechanism is placed, an end portion of the other part of the electric wire is fitted in the waterproof seal, so that the waterproof seal is mounted to the end portion of the other part of the electric wire, in the same manner as described above.

Thereafter, the other part of the electric wire is returned back to the position where the cutter unit is placed. In the position where the cutter unit is placed, a covering of a portion of the other part of the electric wire, which portion is located closer to an end than a portion mounted by the waterproof seal, is stripped off by the cutter unit, so that a core of the other part of the electric wire is exposed.

After the covering is stripped off, the other part of the electric wire is moved to a position where the rear terminal-crimping unit is placed. In the position where the rear terminal-crimping unit is placed, a terminal is crimped onto the portion whose covering has been stripped off, by the rear terminal-crimping unit.

After the terminal is crimped onto the other part of the electric wire, the other part of the electric wire is discharged into a preset electric-wire storage by a discharging member, and the rear cramp is driven to be located back to a position where the rear cramp faces the cutter unit by the rear moving member. In this manner, harnesses each having opposite ends to which waterproof seals are applied and terminals are crimped are sequentially manufactured by the conventional apparatus.

However, the above-described conventional apparatus disclosed in the JP No. 11-345668 employs a method in which a waterproof seal is fed directly to a recess of a seal holder, into which the waterproof seal is fit ("seal acceptance recess") in the seal-inserting mechanism, from the seal-feeding mechanism through the seal feeding tube using feeding air. In this method, an end portion of an electric wire is supposed to be inserted into a waterproof seal which is being fit in the seal acceptance recess of the seal holder.

Accordingly, after the waterproof seal is applied to the end portion of the electric wire and the waterproof seal comes off the seal acceptance recess of the seal holder so that no waterproof seal exists in the seal acceptance recess, a next waterproof seal is fed from the seal-feeding mechanism located at some distance from the seal-inserting mechanism, through the seal feeding tube, to be applied to an end portion of a next electric wire. Thus, the next electric wire must stand by for a longer time before the next waterproof seal arrives, to impose limitation on a processing speed.

Also, in fitting a waterproof seal which is fed through the seal feeding tube into the seal acceptance recess of the seal holder, an air pressure is used. This likely causes variation in a position where a waterproof seal is fit, and thus the conventional apparatus is not reliable in that it is difficult to fit a waterproof seal in a desired position in the seal acceptance recess.

SUMMARY OF THE INVENTION

In view of the foregoing problems, it is an object of the present invention to provide a waterproof-seal inserting apparatus which achieves improvement in a processing speed and reliability.

As a solution to solve the foregoing problem, according to the present invention, a waterproof-seal inserting apparatus for inserting an end portion of an electric wire into a tube-shaped waterproof seal includes a seal-feeding station and a seal-inserting station. The waterproof seal is fed from the seal-feeding station to the seal-inserting station through a seal feeding tube using feeding air. The seal-inserting station includes a seal receiver for receiving the waterproof seal fed through the seal feeding tube, and a seal keeper for keeping the waterproof seal transferred from the seal receiver in an electric-wire insertion position. The seal receiver includes a slider board which is supported slidably between a standby position and a transfer position and includes an acceptance hole in which the waterproof seal fed through the seal feeding tube is fit when the slider board is in the standby position, and a push pin which is movable forward and backward, is located so as to face the acceptance hole of the slider board when the slider board is in the transfer position, and moves forward to push out the waterproof seal fit in the acceptance hole from the acceptance hole and transfer the waterproof seal to the seal keeper.

Preferably, the seal keeper includes: a seal holder including a seal acceptance recess in which the waterproof seal pushed out from the acceptance hole by the push pin is fit; a position changing mechanism for moving the seal holder to put the waterproof seal fit in the seal holder in the electric-wire insertion position; and an electric-wire guiding mechanism for guiding the end portion of the electric wire so that the end portion of the electric wire is inserted into the waterproof seal put in the electric-wire insertion position.

Alternatively, the seal keeper includes: a seal holding pin which is inserted into the waterproof seal pushed out from the acceptance hole by the push pin, to hold the waterproof seal; a position changing mechanism for moving the seal holding pin to move the waterproof seal held by the seal holding pin; a seal holder for grasping opposite side portions of the waterproof seal moved by the position changing mechanism to hold the waterproof seal in the electric-wire insertion position, and receiving the waterproof seal from the seal holding pin; and an electric-wire guiding mechanism for guiding the end portion of the electric wire so that the end portion of the electric wire is inserted into the waterproof seal put in the electric-wire insertion position.

Further preferably, the electric-wire guiding mechanism includes a pair of electric-wire guiding parts which are brought into and out of contact, and a source of driving forces for bringing the pair of electric-wire guiding parts into and out of contact includes a servo motor.

Further preferably, the waterproof-seal inserting apparatus includes a plurality of seal-feeding stations which include the seal-feeding station and include the same structure as the seal-feeding station, a plurality of seal feeding tubes which include the seal feeding tube and include the same structure as the seal feeding tube, and a plurality of the seal-inserting stations which include the seal-inserting station and include the same structure as the seal-inserting station.

Further preferably, the seal keeper of each of the plurality of seal-inserting stations includes a plurality of seal keepers including different kinds of seal keepers described above.

In the waterproof-seal inserting apparatus according to the present invention, the seal-inserting station includes the seal receiver for receiving the waterproof seal fed through the seal feeding tube, and the seal keeper for keeping the waterproof seal transferred from the seal receiver in an electric-wire insertion position. Also, the seal receiver includes the slider board which is supported slidably between the standby position and the transfer position and includes the acceptance hole in which the waterproof seal fed through the seal feeding tube is fit when the slider board is in the standby position, and the push pin which is movable forward and backward, is located so as to face the acceptance hole of the slider board when the slider board is in the transfer position, and moves forward to push out the waterproof seal fit in the acceptance hole from the acceptance hole and transfer the waterproof seal to the seal keeper. Hence, while the end portion of the electric wire is inserted into the waterproof seal transferred to the seal keeper and the waterproof seal is applied to the electric wire, a next waterproof seal can be fed from the seal-feeding station to the acceptance hole of the slider board put in the standby position, to stand by. This makes it possible to promptly send the next waterproof seal to a position where a next step is to be performed, to thereby improve a processing speed.

Also, in transferring the waterproof seal to the seal keeper, the waterproof seal fit in the acceptance hole of the slider board is pushed out from the acceptance hole by the push pin. Such process ensures that the waterproof seal is transferred to a desired position in the seal keeper. Accordingly, the transfer of the waterproof seal can be more reliably accomplished.

Further, in a case where the seal keeper includes: the seal holder including the seal acceptance recess in which the waterproof seal pushed out from the acceptance hole by the push pin is fit; the position changing mechanism for moving the seal holder to put the waterproof seal fit in the seal holder in the electric-wire insertion position; and the electric-wire guiding mechanism for guiding the end portion of the electric wire so that the end portion of the electric wire is inserted into the waterproof seal put in the electric-wire insertion position, the waterproof seal is pushed into the recess of the seal holder by the push pin when transferred. Such process ensures that the waterproof seal is pushed into a desired position of the seal acceptance recess, and thus the transfer of the waterproof seal can be more reliably accomplished.

Also in a case where the seal keeper includes: the seal holding pin which is inserted into the waterproof seal pushed out from the acceptance hole by the push pin to hold the waterproof seal; the position changing mechanism for moving the seal holding pin to move the waterproof seal held by the seal holding pin; the seal holder for grasping opposite side portions of the waterproof seal moved by the position changing mechanism to hold the waterproof seal in the electric-wire insertion position, and receiving the waterproof seal from the seal holding pin; and the electric-wire guiding mechanism for guiding the end portion of the electric wire so that the end portion of the electric wire is inserted into the waterproof seal put in the electric-wire insertion position, the waterproof seal is pushed into the seal holding pin by the push pin when transferred. Such process ensures that the waterproof seal is pushed into a desired position of the seal holding pin, and thus the transfer of the waterproof seal can be more reliably accomplished.

Further, in a case where the electric-wire guiding mechanism includes the pair of electric-wire guiding parts which are brought into and out of contact, and a source of driving forces for bringing the pair of electric-wire guiding parts into and out of contact includes a servo motor, a speed in bringing the pair of electric-wire guiding parts into and out of contact and reliability in position control are improved. Also in this respect, the processing speed can be improved.

Moreover, in a case where the plurality of seal-feeding stations, the plurality of seal feeding tubes, and the plurality of seal-inserting stations are provided, a change in type of the waterproof seal can be easily addressed by appropriate selection. Thus, processes necessary for exchanging stages can be facilitated.

Furthermore, in a case where the seal keeper of each of the plurality of seal-inserting stations includes different kinds of seal keepers described above, it is possible to select one of the seal keepers which conforms with each type of the waterproof seal, to increase user-friendliness.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
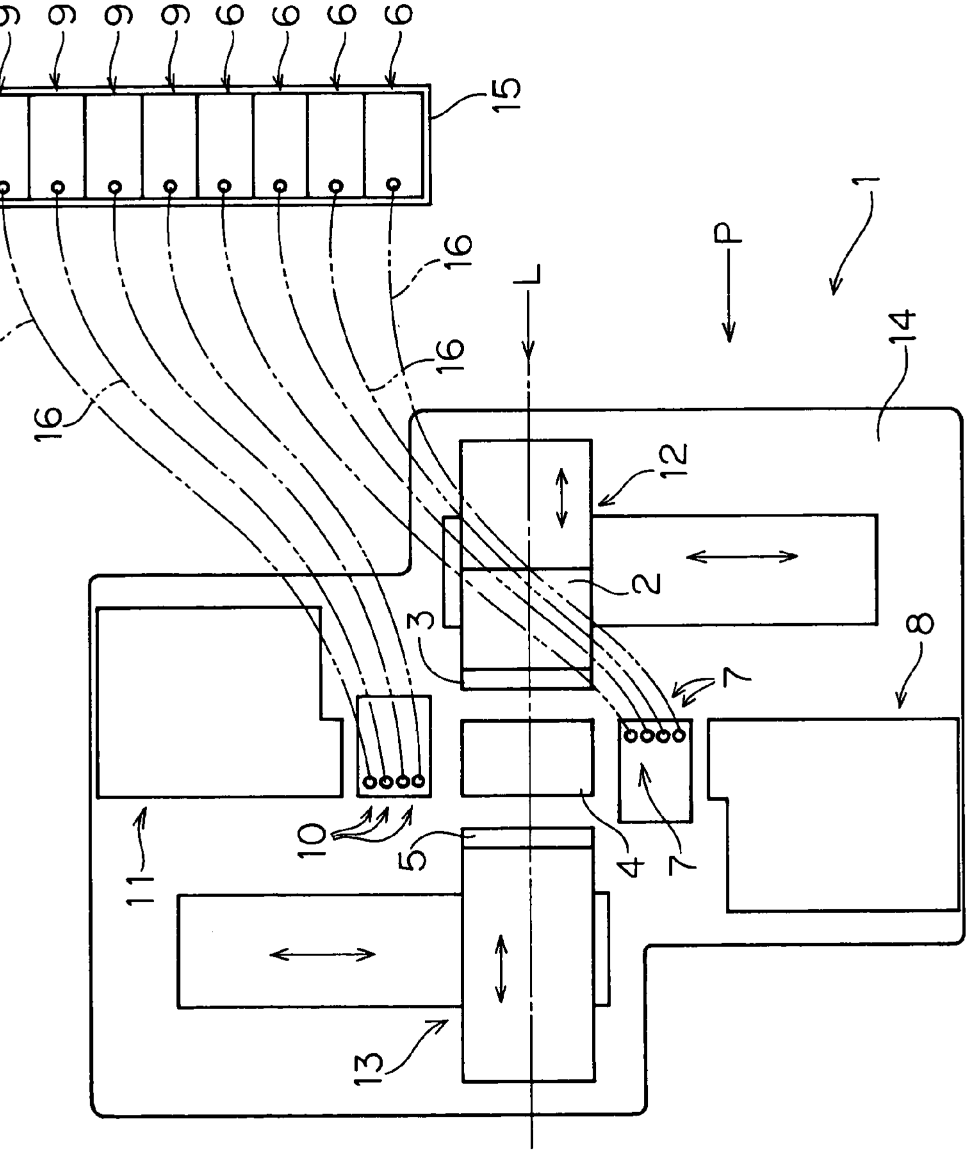
FIG. 1 is a plan view of a structure according to a first preferred embodiment of the present invention.
Figure 2:
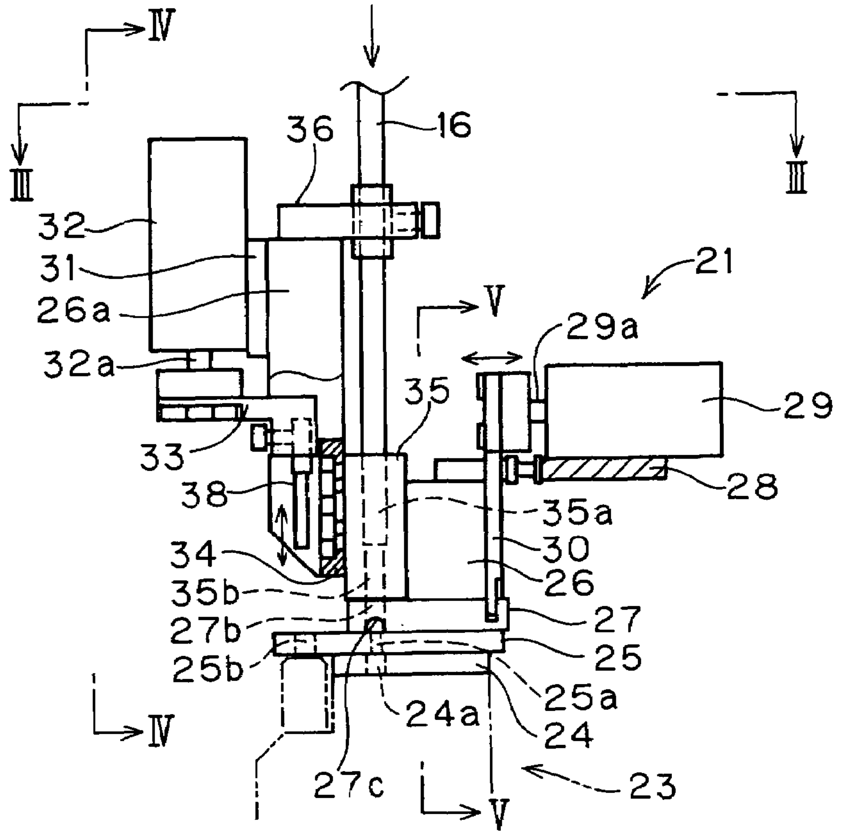
FIG. 2 is a side view of a portion of a seal receiver.

Below, a first preferred embodiment of the present invention will be described with reference to accompanying drawings. FIG. 1 illustrates one example of an electric-wire processing apparatus 1 including an electric-wire inserting apparatus for applying a tube-shaped waterproof seal made of a rubber or the like to an end portion of the electric wire and crimping a terminal to the end portion of the electric wire. The electric-wire processing apparatus 1 includes a dimension measuring unit 2, a front cramp 3, a cutter unit 4, a rear cramp 5, front seal-feeding stations 6, front seal-inserting stations 7, a front terminal-crimping unit 8, real sear-feeding stations 9, rear seal-inserting stations 10, a rear terminal-crimping unit 11, a front moving member 12, and a rear moving member 13, similarly to the above-described conventional apparatus.

Also similarly to the conventional apparatus, in the electric-wire processing apparatus 1, a predetermined amount of electric wire which is fed in a direction indicated by an arrow P along an electric-wire feeding line L is grasped by the front cramp 3 and the rear cramp 5. Subsequently, the electric wire is cut by the cutter unit 4, to be divided into two parts which are grasped by the front cramp 3 and the rear cramp 5, respectively.

Next, one part out of the two parts of the electric wire which is grasped by the front cramp 3 is moved to a position where one of the front seal-inserting stations 7 is placed. Each of the front seal-inserting stations 7 receives waterproof seals which are sequentially fed from a corresponding one of the front seal-feeding stations 6. In the position where the front seal-inserting station 7 is placed, an end portion of the one part of the electric wire is fitted in one of the waterproof seals, so that the waterproof seal is mounted to the end portion of the one part of the electric wire.

Thereafter, the one part of the electric wire is returned back to a position where the cutter unit 4 is placed. In the position where the cutter unit 4 is placed, a covering of a portion of the one part of the electric wire, which portion is located closer to an end than a portion mounted by the waterproof seal, is stripped off by the cutter unit 4, so that a core of the one part of the electric wire is exposed.

After the covering is stripped off, the one part of the electric wire is moved to a position where the front terminal-crimping unit 8 is placed. In the position where the front terminal-crimping unit 8 is placed, a terminal is crimped onto the portion whose covering has been stripped off, by the front terminal-crimping unit 8.

After the terminal is crimped onto the one part of the electric wire, the one part of the electric wire is driven to be located to a position where the one part of the electric wire faces the cutter unit 4 by the front moving member 12. Then, a predetermined amount of electric wire is further fed in the predetermined direction P along the electric-wire feeding line L by the dimension measuring unit 2.

Thereafter, the electric wire which is further fed is grasped by the front cramp 3 and the rear cramp 5 and cut by the cutter unit 4, to be divided into two parts grasped by the front cramp 3 and the rear cramp 5, respectively. Thereafter, the same processes as described above are performed on an end portion of one part of the electric wire which is grasped by the front cramp 3, so that a terminal is crimped onto the one part of the electric wire.

On the other hand, the other part of the electric wire which is grasped by the rear cramp 5, is moved to a position where one of the rear seal-inserting stations 10 is placed. Each of the rear seal-inserting station 10 receives waterproof seals which are sequentially fed from a corresponding one of the rear seal-feeding stations 9. In the position where the rear seal-inserting station 10 is placed, an end portion of the other part of the electric wire is fitted in one of the waterproof seals, so that the waterproof seal is mounted to the end portion of the other part of the electric wire.

Thereafter, the other part of the electric wire is returned back to the position where the cutter unit 4 is placed. In the position where the cutter unit 4 is placed, a covering of a portion of the other part of the electric wire, which portion is located closer to an end than a portion mounted by the waterproof seal, is stripped off by the cutter unit 4, so that a core of the other part of the electric wire is exposed.

After the covering is stripped off, the other part of the electric wire is moved to a position where the rear terminal-crimping unit 11 is placed. In the position where the rear terminal-crimping unit 11 is placed, a terminal is crimped onto the portion whose covering has been stripped off, by the rear terminal-crimping unit 11.

After the terminal is crimped onto the other part of the electric wire, the other part of the electric wire is discharged into a preset electric-wire storage by a discharging member (not illustrated), and the rear cramp 5 is driven to be located back to a position where the rear cramp 5 faces the cutter unit 4, by the rear moving member 13. In this manner, harnesses each having opposite ends to which waterproof seals are applied and terminals are crimped are sequentially manufactured.

In the electric-wire processing apparatus 1, the seal-feeding stations 6 and 9 are placed on a separate stand 15 different from a body stand 14 on which a body of the electric-wire processing apparatus 1 is placed. Particularly, according to the first preferred embodiment, a plurality of (four, for example) front seal-feeding stations 6 and a plurality of (four, for example) rear seal-feeding stations 9 are arranged side by side on the separate stand 15. Four different types of waterproof seals are accommodated in the four seal-feeding stations 6 or 9, respectively.

Each of the seal-feeding stations 6 and 9 has a structure similar to that in the conventional apparatus as disclosed in JP No. 11-345668, for example. Specifically, each of the seal-feeding stations 6 and 9 includes an oscillating part-feeder serving as a seal-feeding mechanism for sequentially feeding waterproof seals in an orderly fashion. Then, each of the seal-feeding stations 6 and 9 feeds sequentially waterproof seals one by one to a corresponding one of the plurality of seal-inserting stations 7 and 10 through a corresponding one of seal feeding tubes 16, using feeding air having a suitable air pressure such as a compressed air obtained by compressing air with a compressor or the like.

According to the first preferred embodiment, each of waterproof seals includes a portion to which a terminal is to be crimped ("terminal portion") and a portion which contributes to sealing ("sealing portion"). The terminal portion has a smaller diameter than the sealing portion. When each waterproof seal is fed to the seal-inserting station 7 or 10 through the seal feeding tube 16, the waterproof seal is set such that the terminal portion is located ahead of the sealing portion.

The seal-inserting stations 7 and 10 have a similar structure. Specifically, each of the seal-inserting stations 7 and 10 includes a seal receiver 21 for receiving waterproof seals 20 fed through a corresponding one of the seal feeding tubes 16 and a seal keeper 23 for receiving the waterproof seals 20 from the seal receiver 21 and keeping each of the waterproof seals 20 in a position ready for insertion of an electric wire 22 thereinto ("electric-wire insertion position"), as illustrated in FIGS. 2 through 22.

The seal keeper 23 is supported on the body stand 14, and the seal receiver 21 is supported on the seal keeper 23.

The seal receiver 21 includes a rectangular fixing board 24 which is supported by and secured to the seal keeper 23, a rectangular slider supporting board 25 secured to the fixing board 24, a pair of sidewall boards 26 which are placed on opposite sides of the slider supporting board 25 and stand upright on the fixing board 24, and a slider board 27 which is located between the pair of sidewall boards 26, placed and supported on the slider supporting board 25, and is slidable along the pair of sidewall boards 26, as illustrated in FIGS. 2, 3, 4, 5, 16, 17, and 18.

An escape cylinder 29 including an air cylinder or the like is supported at one ends of top portions of the pair of sidewall boards 26 with a supporting board 28 interposed therebetween. A rectangular geared board 30 is connected to a cylinder rod 29*a* of the escape cylinder 29. The geared board 30 has a bottom portion connected to the slider board 27. According to the first preferred embodiment, the bottom portion of the geared board 30 is fit in a groove 27*a* formed in an upper surface of the slider board 27, to establish the connection between the geared board 30 and the slider board 27.

Then, reciprocating motion of the escape cylinder 29 causes the slider board 27 to slide on the slider supporting board 25 via the geared board 30. In sliding, the slider board 27 is guided by the pair of sidewall boards 26. When the cylinder rod 29*a* of the escape cylinder 29 moves forward in the reciprocating motion, the waterproof seal 20 is transferred to the slider board 27. It is noted that a position of each of the cylinder rod 29*a* and the slider board 27 at that time is referred to a "transfer position" (indicated by a broken line in FIG. 16). On the other hand, a position of each of the cylinder rod 29*a* and the slider board 27 when the cylinder rod 29*a* moves backward in the reciprocating motion is referred to a "standby position" (indicated by a solid line in FIG. 16).

At the other ends of the top portions of the pair of sidewall boards 26, supporting arms 26*a* extend so as to protrude upward. Also, an inserting cylinder 32 including an air cylinder or the like is supported by a supporting board 31 provided across respective upper portions of the supporting arms 26*a*. The inserting cylinder 32 includes a cylinder rod 32*a* in which a pin holder 33 is provided.

Figure 3:
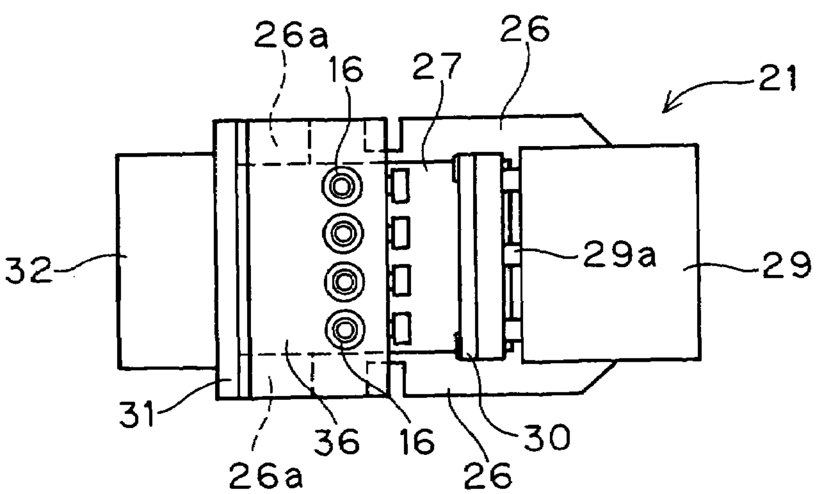
FIG. 3 is a sectional view taken along a line III-III in FIG. 2.
Figure 4:
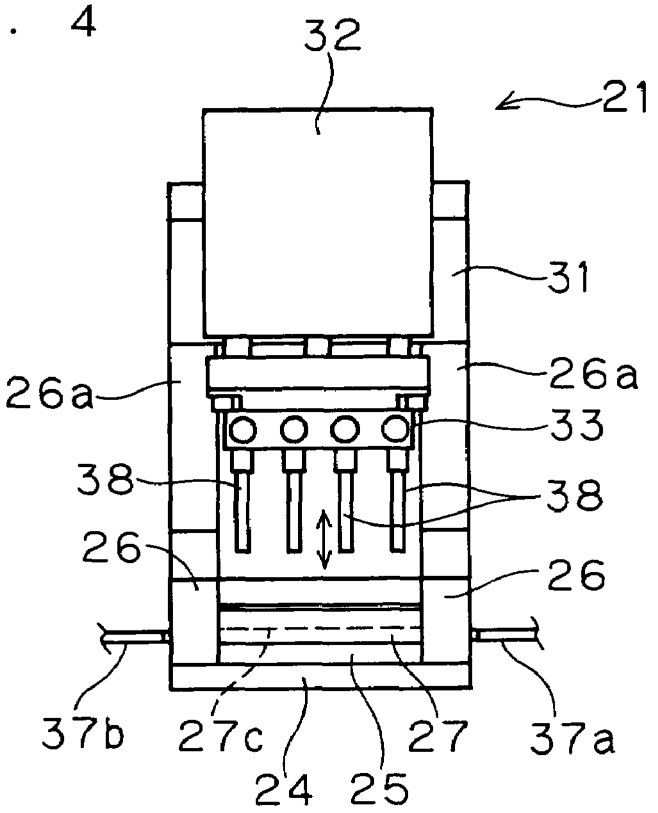
FIG. 4 is a sectional view taken along a line IV-IV in FIG. 2.
Figure 5:
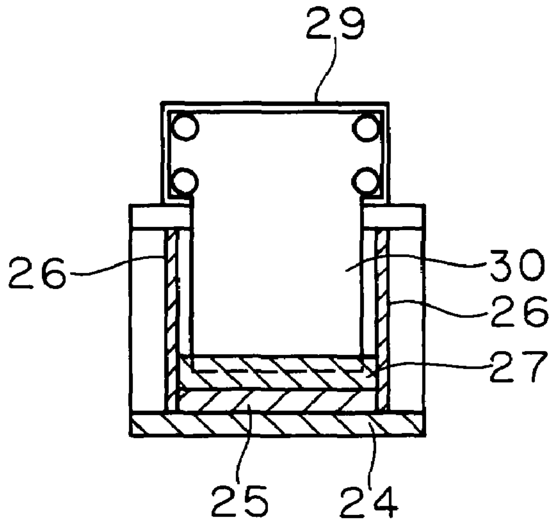
FIG. 5 is a sectional view taken along a line V-V in FIG. 2.
Figure 6:
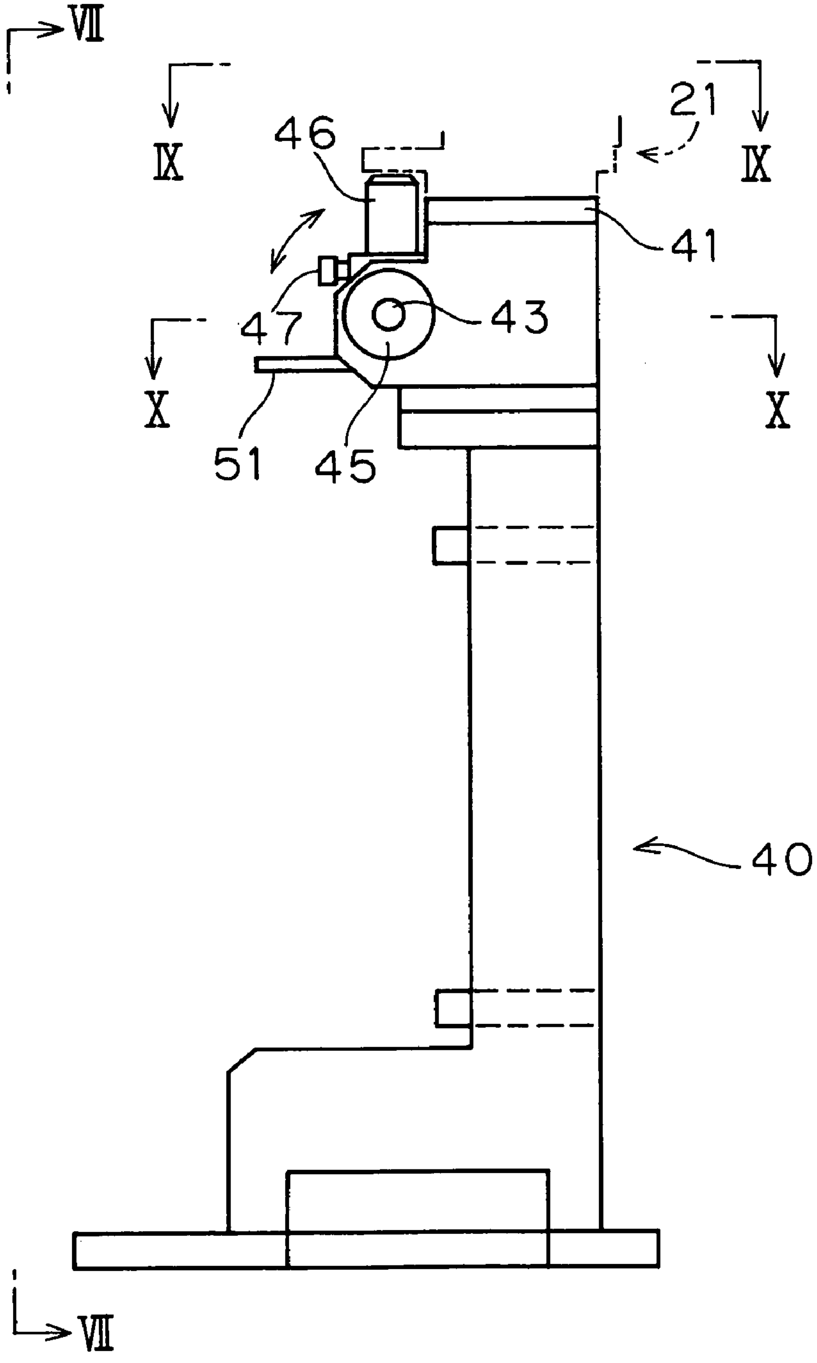
FIG. 6 is a side view of a portion of a seal keeper.
Figure 7:
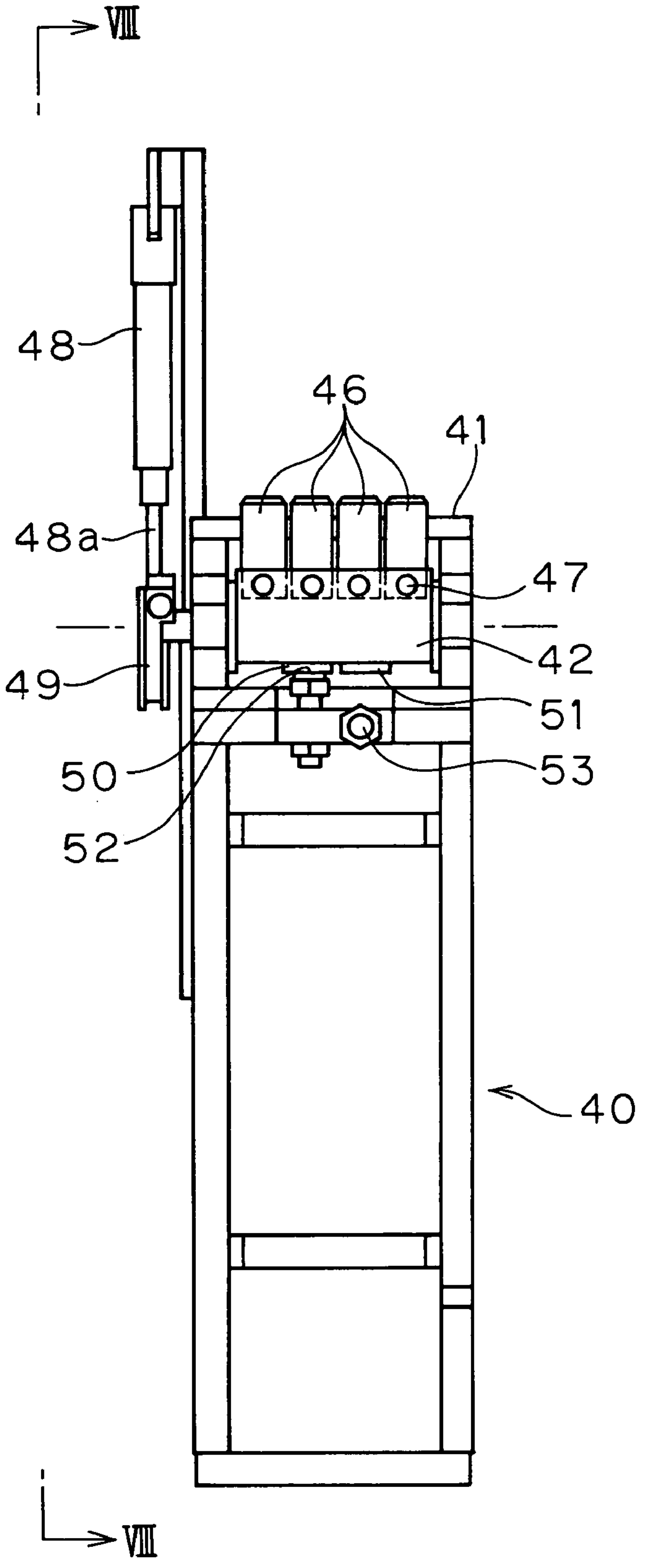
FIG. 7 is a sectional view taken along a line VII-VII in FIG. 6.
Figure 8:
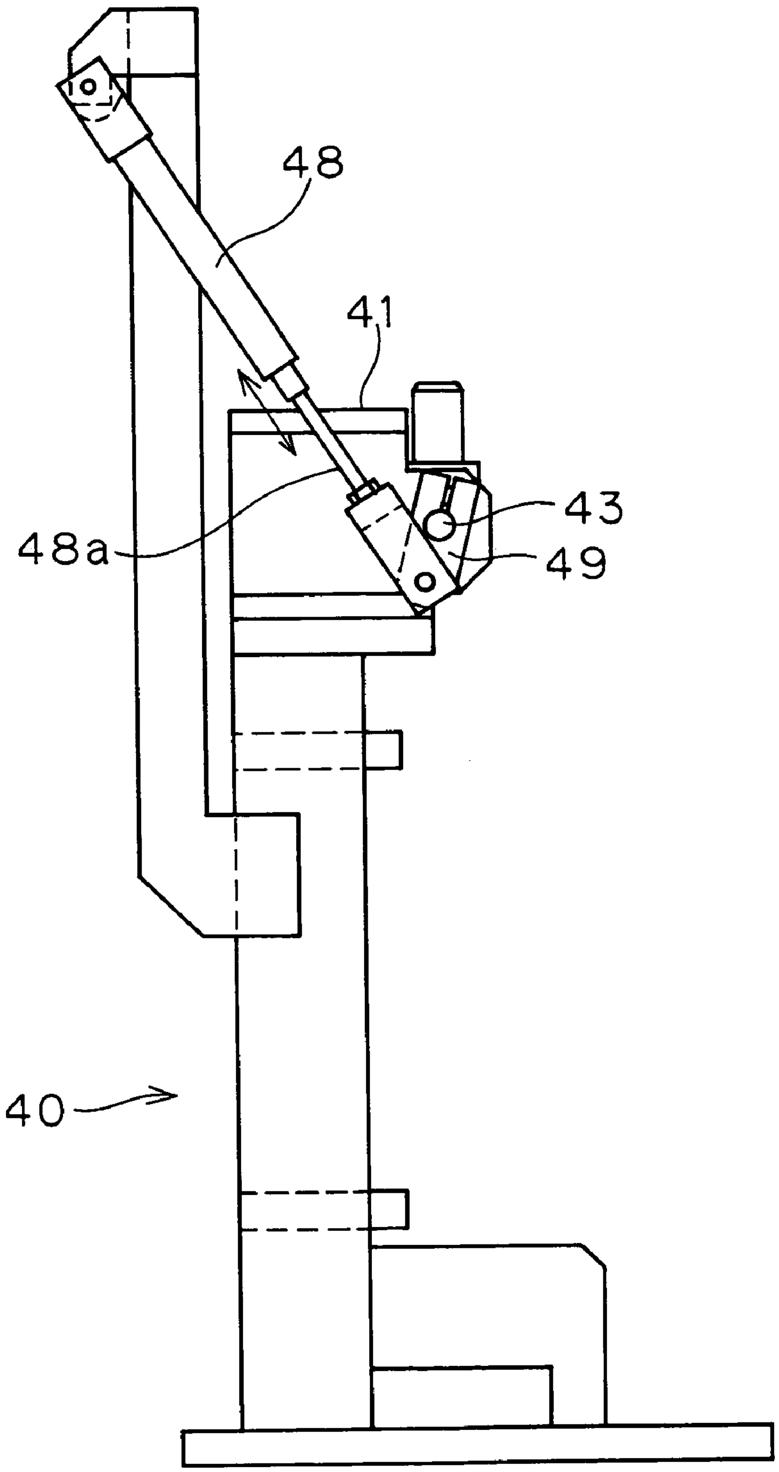
FIG. 8 is a sectional view taken along a line VIII-VIII in FIG. 7.
Figure 9:
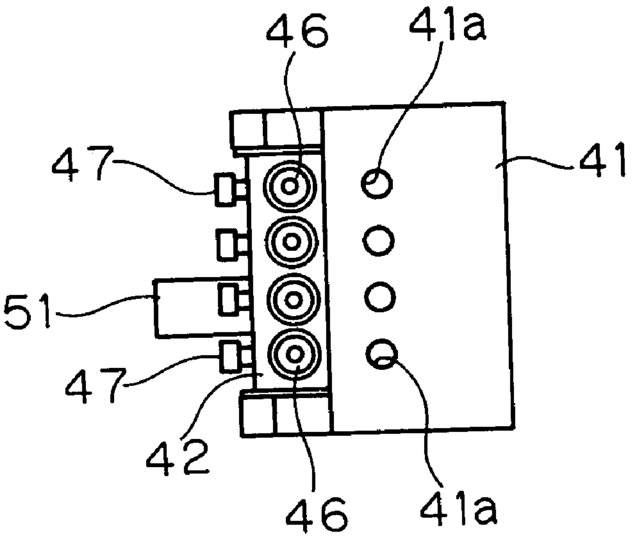
FIG. 9 is a sectional view taken along a line IX-IX in FIG. 6.
Figure 10:
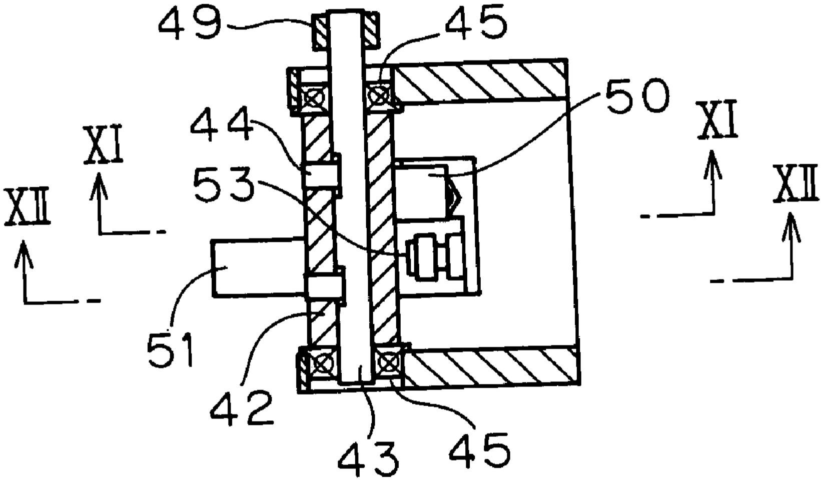
FIG. 10 is a sectional view taken along a line X-X in FIG. 6.

Further, a block-shaped seal guide 35 is detachably attached to a surface of a seal guide holder 34 provided across respective bottom portions of the supporting arms 26*a*, which surface faces the geared board 30. A supporting board 36 is provided over respective top end faces of the supporting arms 26*a*, and each of the seal feeding tubes 16 are detachably inserted into and supported by the supporting board 36. In this regard, the seal feeding tubes 16 extending from the front seal-feeding stations 6 are arranged side by side at regular intervals along a direction of movement of the moving members 12 and 13, as illustrated in FIGS. 1 and 3.

Moreover, respective lower ends (the other ends) of the seal feeding tubes 16 which are inserted into and supported by the supporting board 36 are fit in, and held by, access holes 35*a* formed side by side in the seal guide 35, respectively. Also in the access holes 35*a*, the seal feeding tubes 16 are arranged side by side at regular intervals along the direction of movement of the moving members 12 and 13, in the same manner as described above. In the seal guide 35, also guide holes 35*b* vertically communicated with the access holes 35*a*, respectively, are formed. The waterproof seals 20 fed through the seal feeding tubes 16 using feeding air are sent out downward through the guide holes 35*b*.

While the waterproof seals 20 are sent out downward, the slider board 27 is put in the standby position and acceptance holes 27*b* in which the waterproof seals 20 can be detachably fit are present just under the guide holes 35*b*, respectively. The acceptance holes 27*b* of the slider board 27 are arranged side by side in the slider board 27. Accordingly, each of the waterproof seals 20 fed through the seal feeding tubes 16 is fit in one of the acceptance holes 27*b* of the slider board 27 which is put in the standby position, through a corresponding one of the guide holes 35*b*.

Also, air vents 25*a* each having a small diameter which does not allow passage of the waterproof seals 20 are formed side by side so as to face the acceptance holes 27*b* of the slider board 27, respectively, in the slider supporting board 25. Further, communication holes 24*a* which are communicated with the air vents 25*a*, respectively, are formed so as to face the air vents 25*a* of the slider supporting board 25, in the fixing board 24.

Furthermore, a detection path 27*c* which extends along an array of the acceptance holes 27*b* is formed in the acceptance holes 27*b* in a bottom portion of the slider board 27. Optical fiber sensors 37*a* and 37*b* for light emission and light reception are respectively provided in portions of the pair of sidewall boards 26 between which the detection path 27*c* is interposed. Then, feeding of the waterproof seals 20 to the acceptance holes 27*b* is detected by prevention of light transmittance.

Further, passage guiding holes 25*b* through which the waterproof seals 20 can pass are formed side by side in the slider supporting board 25, so as to face the acceptance holes 27*b* when the slider board 27 is put in the transfer position.

Push pins 38 are detachably attached to the pin holder 33 and arranged side by side above the passage guiding holes 25*b*, respectively. When the slider board 27 is put in the transfer position, the cylinder rod 32*a* of the inserting cylinder 32 moves forward, so that the pin holder 33 moves downward, to move downward the push pins 38.

Subsequently, the push pins 38 pass through the acceptance holes 27*b* and the passage guiding holes 25*b*, to push out downward the waterproof seals 20 held by the acceptance holes 27*b*. Then, the waterproof seals 20 are transferred to the seal keeper 23 placed below the seal receiver 21.

Additionally, an inner diameter of each of the acceptance holes 27*b* and the passage guiding holes 25*b*, an outer diameter of each of the push pins 38, or the like, is appropriately determined according to the maximum outer diameter of the various types of the waterproof seals 20 fed through the seal feeding tubes 16. Each of the slider supporting board 25, the slider board 27, the push pins 38, and the like, is exchangeable with another, as needed.

The seal keeper 23 includes a supporting frame 40 which is appropriately assembled and supported on the body stand 14, as illustrated in FIG. 6 through 22. Further, a supporting board 41 to which the fixing board 24 of the seal receiver 21 is detachably attached is placed on the supporting frame 40. Communication holes 41*a* communicated with the communication holes 24*a* of the fixing board 24, respectively, are formed in the supporting board 41.

A holder supporting block 42 is provided under the passage guiding holes 25*b* of the slider supporting board 25. A supporting shaft 43 having an axis along an array of the passage guiding holes 25*b* is connected to the holder supporting block 42 via a setscrew 44 or the like so as to be rotatable together with the holder supporting block 42. The supporting shaft 43 is rotatably supported by the supporting frame 40 via a bearing 45.

Seal holders 46 are fit in, and detachably attached to, a top surface of the holder supporting block 42 by setscrews 47 or the like. The seal holders 46 are located so as to face the passage guiding holes 25*b*, respectively. A top surface of each of the seal holders 46 is located close to a bottom surface of the slider supporting board 25, and seal acceptance recesses 46*a* in which the waterproof seals 20 pushed out through the passage guiding holes 25*b* are fit are formed in respective upper portions of the seal holders 46 so as to face the passage guiding holes 25*b*, respectively.

Each of the seal acceptance recesses 46*a* is formed so as to be step-like, i.e., so as to include portions having different diameters respectively corresponding to the larger diameter and the smaller diameter of each of the waterproof seals 20 fed by an pushing operation of the push pins 38. Also, the seal holders 46 are set such that the respective top surfaces of the seal holders 46 are substantially flush with respective bottoms of the push pins 38 when the cylinder rod 32*a* of the inserting cylinder 32 moves forward to move downward the push pins 38.

Further, communication holes 46*b* are formed under the seal acceptance recesses 46*a*, respectively.

Then, the holder supporting block 42 is pivotable on the axis of the supporting shaft 43 by reciprocating motion of a swing cylinder 48 which includes an air cylinder or the like and is placed on one side surface of the supporting frame 40. To this end, one end of the swing cylinder 48 is pivotably supported by the supporting frame 40, and the other end of the swing cylinder 48 is pivotably supported by a geared link 49 connected to one end of the supporting shaft 43. As a result, as illustrated in FIGS. 7, 8, 16, 17, and 18, when a cylinder rod 48*a* of the swing cylinder 48 moves forward, the seal holders 46 are located on the top surface of the holder supporting block 42. At that time, each of the seal holders 46 is in a vertical position ready for receipt of waterproof seals ("seal receipt position"). On the other hand, when the cylinder rod 48*a* of the swing cylinder 48 moves backward, the holder supporting block 42 together with the supporting shaft 43 is turned 90 degrees via the geared link 49. As a result, while the cylinder rod 48*a* is retracted, the seal holders 46 are located on the side surface of the holder supporting block 42. At that time, each of the seal holders 46 is in a horizontal position ready for insertion of the electric wire ("electric-wire insertion position"), as illustrated in FIGS. 19, 20, 21, and 22.

Figure 11:
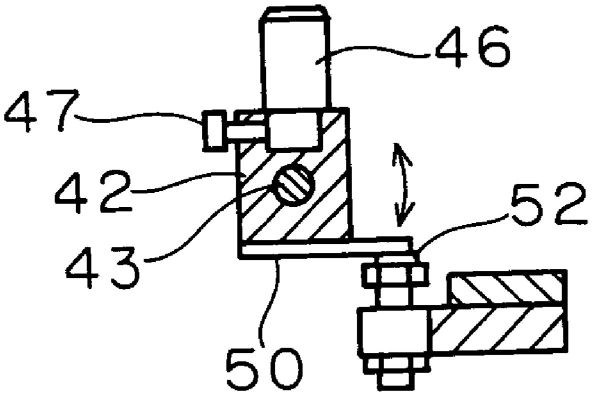
FIG. 11 is a sectional view taken along a line XI-XI in FIG. 10.
Figure 12:
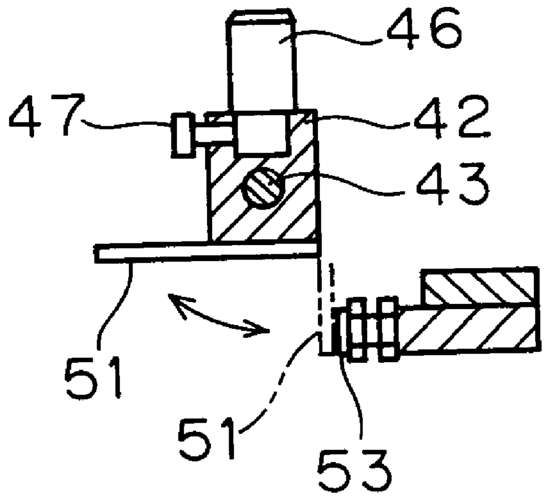
FIG. 12 is a sectional view taken along a line XII-XII in FIG. 10.

The holder supporting block 42 includes a stopper 50 for controlling the vertical positions of the seal holders 46 and a stopper 51 for controlling the horizontal positions of the seal holders 46. When the swing cylinder 48 moves forward and backward, the stoppers 50 and 51 removably abut stopper catchers 52 and 53 provided in the supporting frame 40, respectively, to thereby keep each of the seal holders 46 in the vertical position and the horizontal position, respectively, as illustrated in FIGS. 11 and 12.

The holder supporting block 42, the swing cylinder 48, the geared link 49 and the like construct a position changing mechanism for putting the waterproof seal 20 fit in the seal acceptance recess 46*a* of each of the seal holders 46 in the electric-wire insertion position. Additionally, though the swing cylinder 48 which is extentable is employed as a member for turning 90 degrees each of the seal holders 46 to switch the position of each of the seal holders 46 between the vertical position and the horizontal position, a rotary actuator may be employed for turning the seal holders 46, in place of the swing cylinder 48.

Figure 13:
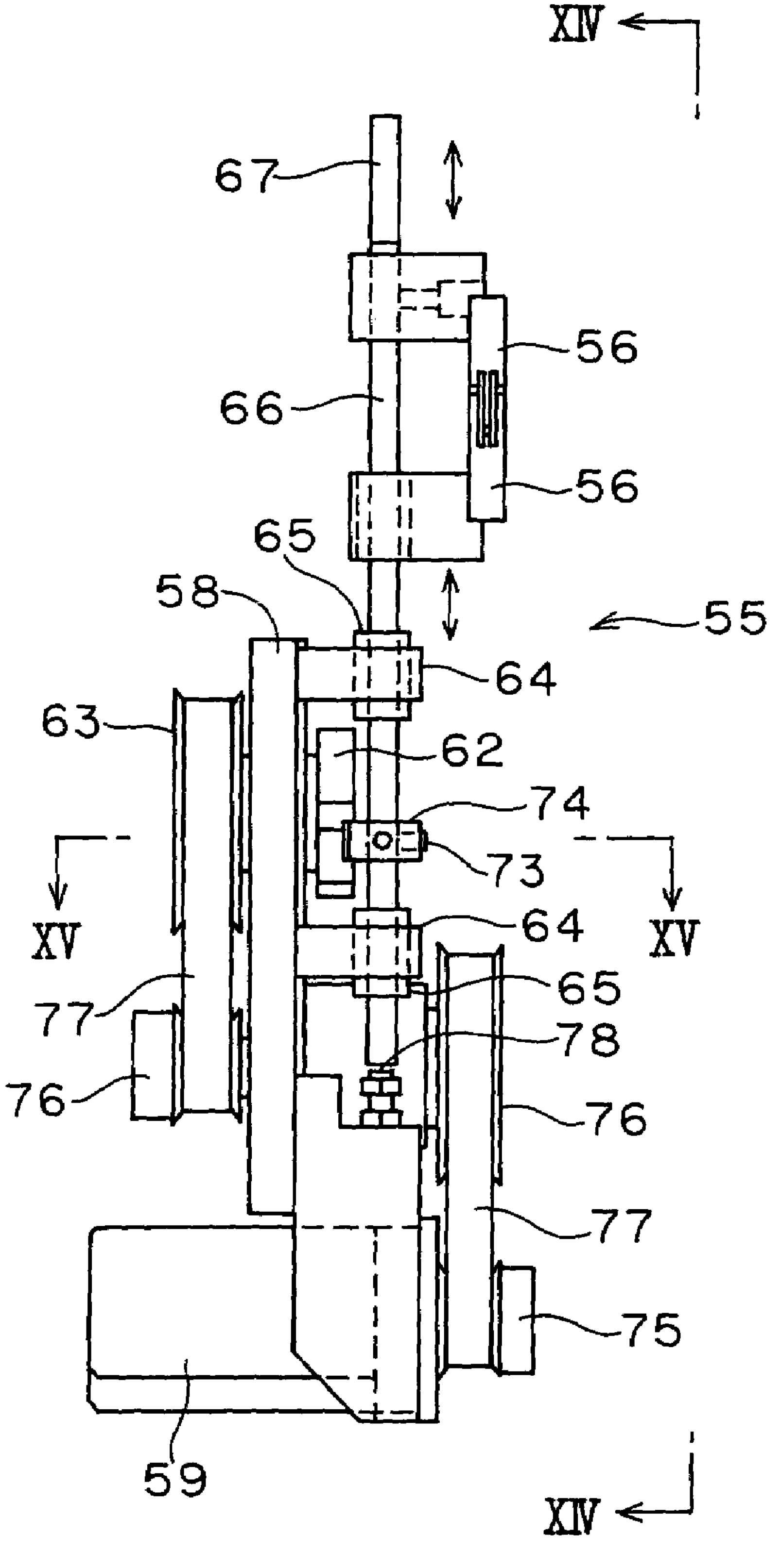
FIG. 13 is a side view of an electric-wire guiding mechanism.
Figure 14:
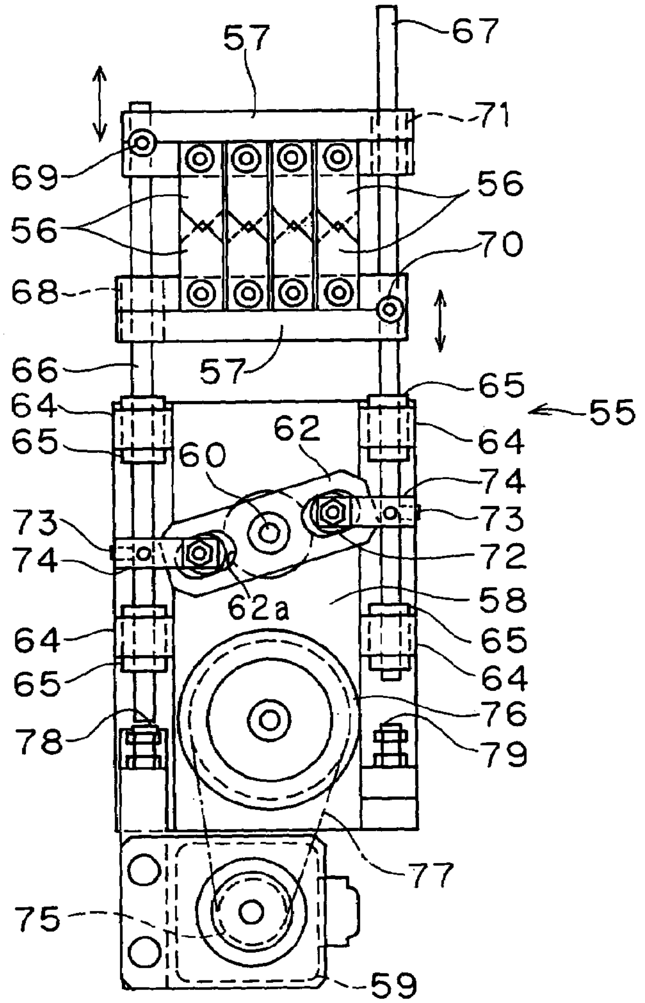
FIG. 14 is a sectional view taken along a line XIV-XIV in FIG. 13.
Figure 15:
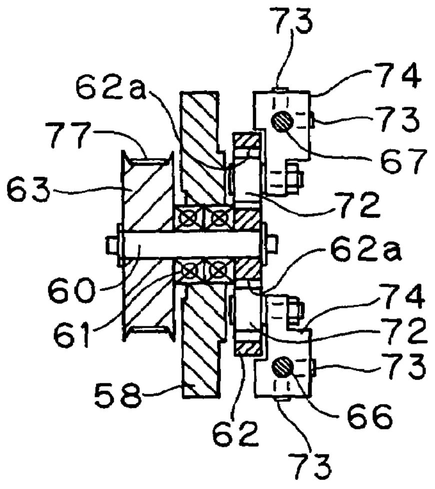
FIG. 15 is a sectional view taken along a line XV-XV in FIG. 14.

When each of the seal holders 46 is in the horizontal position, i.e., the electric-wire insertion position, an electric-wire guiding mechanism 55 illustrated in FIGS. 13, 14, and 15 is located close to the seal acceptance recesses 46*a* of the seal holders 46. The electric-wire guiding mechanism 55 is attached to, and supported by, the supporting frame 40 or the body stand 14.

The electric-wire guiding mechanism 55 includes pairs of vertically-arranged (upper and lower) electric-wire guiding parts 56. The pairs of electric-wire guiding parts 56 face the seal holders 46, respectively. The upper electric-wire guiding part 56 and the lower electric-wire guiding part 56 in each pair are detachably attached to upper and lower control blocks 57, respectively, by screws or the like. The upper and lower control blocks 57 vertically move the upper and lower electric-wire guiding parts 56 in synchronization with each other, to bring the upper and lower electric-wire guiding parts 56 into and out of contact with each other.

According to the first preferred embodiment, each of the electric-wire guiding parts 56 includes an electric-wire guiding groove 56*a* having a structure similar to that disclosed in JP No. 11-345668. Specifically, each of the electric-wire guiding grooves 56*a* is V-shaped when viewed from a direction of insertion of the electric wire 22, and two electric-wire guiding grooves 56*a* in each of the pairs of electric-wire guiding parts 56 can be engaged with each other. In order to allow two electric-wire guiding grooves 56*a* in each of the pairs of electric-wire guiding parts 56 to be engaged with each other, each tooth of the electric-wire guiding parts 56, which tooth forms the V-shaped electric-wire guiding groove 56*a*, has a shape of a triangle with surfaces inclined at an angle of 45 degrees relative to the direction of insertion of the electric wire 22. Also, in each of the pairs of electric-wire guiding parts 56, the inclined surfaces of each tooth in the upper electric-wire guiding part 56 are parallel to the inclined surfaces of each tooth in the lower electric-wire guiding part 56. It is additionally noted that the structure of each of the electric-wire guiding parts 56 is not limited to the above-described structure, and other well-known structures may be appropriately employed as the structure of each of the electric-wire guiding parts 56.

Further, the electric-wire guiding mechanism 55 includes a rectangular supporting board 58 and a servo motor 59 serving as a source of driving forces for bringing each of the pairs of the electric-wire guiding parts 56 into and out of contact with each other. The servo motor 59 is placed below the supporting board 58. Moreover, a pivotal shaft 60 is placed above the supporting board 58 and is rotatably supported by the supporting board 58 via a bearing 61. An elongated cam plate 62 is connected to a projecting end of the pivotal shaft 60 such that the cam plate 62 together with the pivotal shaft 60 is rotatable, and a timing pulley 63 is connected to the other projecting end of the pivotal shaft 60 such that the timing pulley 63 together with the pivotal shaft 60 is rotatable.

Bushing cases 64 are provided on opposite side portions of a surface of the supporting board 58 above which the cam plate 62 is provided. The bushing cases 64 are at a distance from each other along a vertical direction. Each of the bushing cases 64 is provided with a linear bushing 65 having a vertical axis.

Further, opening/closing shafts 66 and 67 extend across, and are supported by, the linear bushings 65 on each of the opposite side portions of the supporting board 58. Each of the opening/closing shafts 66 and 67 can vertically slide. A portion of the opening/closing shaft 66 which protrudes upward from the supporting board 58 passes through a linear bushing 68 provided at one end of the lower control block 57, and further passes through one end of the upper control block 57, to be secured to the upper control block 57 by a setscrew 69.

On the other hand, a portion of the opening/closing shaft 67 which protrudes upward from the supporting board 58 passes through the other end of the lower control block 57, to be secured to the lower control block 57 by a setscrew 70, and further passes through a linear bushing 71 provided at the other end of the upper control block 57.

Then, cam rollers 72 are fit in and held by cam holes 62*a* formed on opposite side portions of the cam plate 62. Each of the cam holes 62*a* has a shape of an elongated circle. The cam rollers 72 can slide relative to each other along lengths thereof. The cam rollers 72 are connected to and supported by connection blocks 74 which are located on opposite sides of the cam rollers 72 and respectively secured to the opening/closing shafts 66 and 67 by setscrews 73 or the like.

Also, a driving pulley 75 including a timing pulley is provided in a drive shaft of the servo motor 59. The driving pulley 75 and the timing pulley 63 connected to the pivotal shaft 60 are interlocking and connected with each other via an interlocking mechanism including a relay pulley 76 composed of a plurality of timing pulleys and a plurality of timing belts 77 running across the pulleys 63, 75, and 76.

Accordingly, clockwise and counterclockwise rotation of the servo motor 59 allows the cam plates 62 to be pivoted clockwise and counterclockwise via the pulleys 63, 75, and 76, and the timing belts 77. Then, the clockwise and counterclockwise pivoting of the cam plates 62 causes the connection blocks 74 on the opposite sides of the cam plates 62 to move upward and downward via the cam rollers 72 fit in the cam holes 62*a*. Further, as a result of the connection blocks 74 being vertically moved relative to each other, the opening/closing shafts 66 and 67 are vertically moved relative to each other, while being guided by the linear bushings 65, 68, and 71. The relative movement of the opening/closing shafts 66 and 67 allows the control blocks 57 to which the opening/closing shafts 66 and 67 are respectively secured to be brought into and out of contact with each other.

Furthermore, stopper catchers 78 and 79 for controlling the lowest positions of the opening/closing shafts 66 and 67 are provided below the opening/closing shafts 66 and 67, respectively, in the supporting board 58.

The apparatus according to the first preferred embodiment has the above-described structure. Next, processes for feeding the waterproof seal 20 to each of the seal-inserting stations 7 and 10 and applying the waterproof seal 20 to the electric wire 22 will be described.

Figure 16:
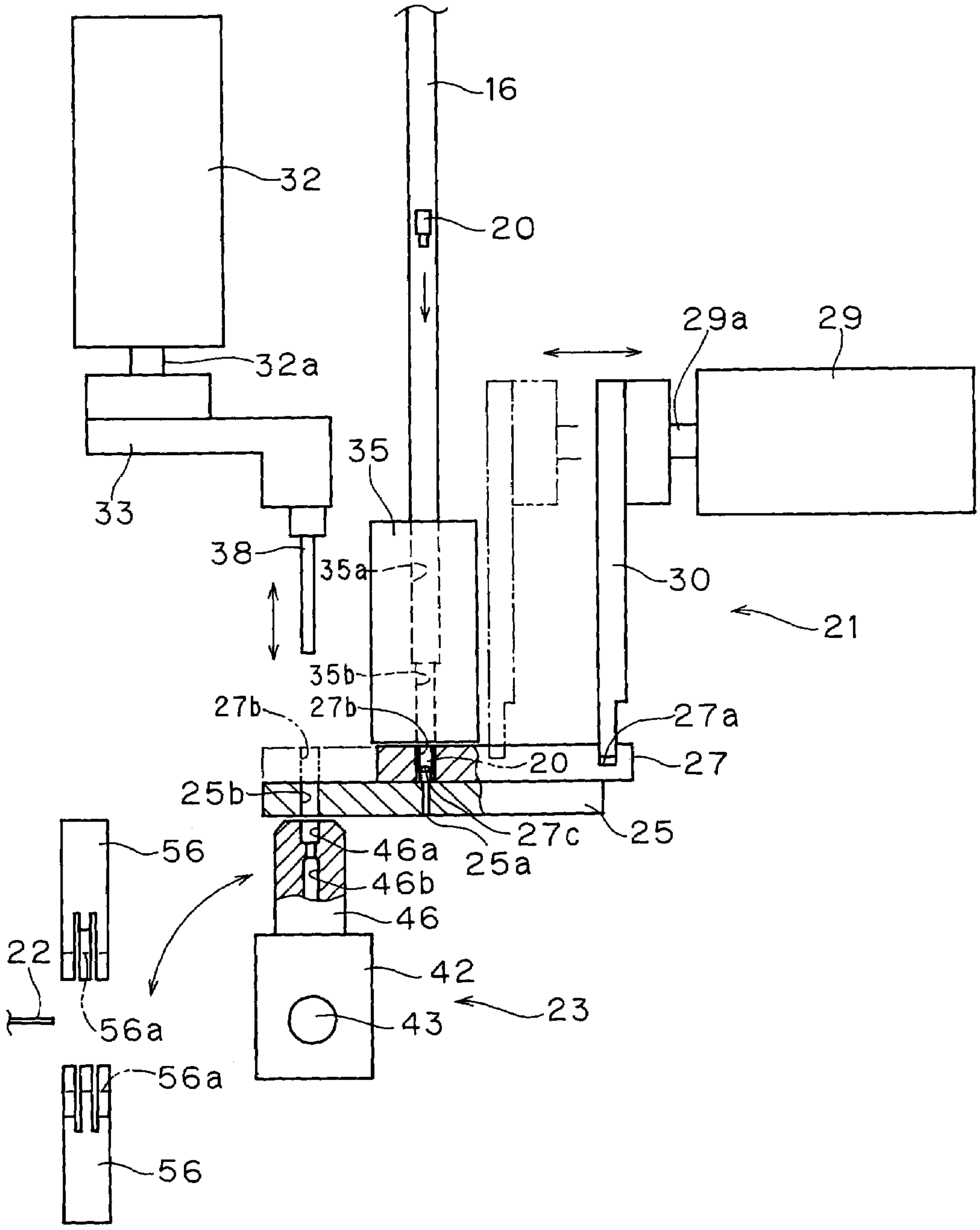
FIG. 16 through FIG. 22 illustrate processes for inserting an end portion of an electric wire into a waterproof seal.

First, in an initial state, each of the cylinder rod 29*a* of the escape cylinder 29 in the seal receiver 21 and the slider board 27 is in the standby position, as indicated by a solid line in FIG. 16. Also, the cylinder rod 32*a* of the inserting cylinder 32 is retracted. Further, each of the seal holders 46 in the seal keeper 23 is in the vertical position, i.e., the seal receipt position, and the electric-wire guiding parts 56 in each pair are out of contact with each other (opened). In such initial state, the waterproof seals 20 as targets of insertion are fed one by one from the seal-feeding stations 6 and 9 to the seal-inserting stations 7 and 10 through the seal feeding tubes 16 using feeding air.

Then, each of the waterproof seals 20 fed through the seal feeding tubes 16 is fit in one of acceptance holes 27*b* of the slider board 27 through one of the guide holes 35*b* of the seal guide 35. Arrival of each of the waterproof seals 20 at the acceptance hole 27*b* is detected by prevention of light transmittance in the optical fiber sensors 37*a* and 37*b*.

Figure 17:
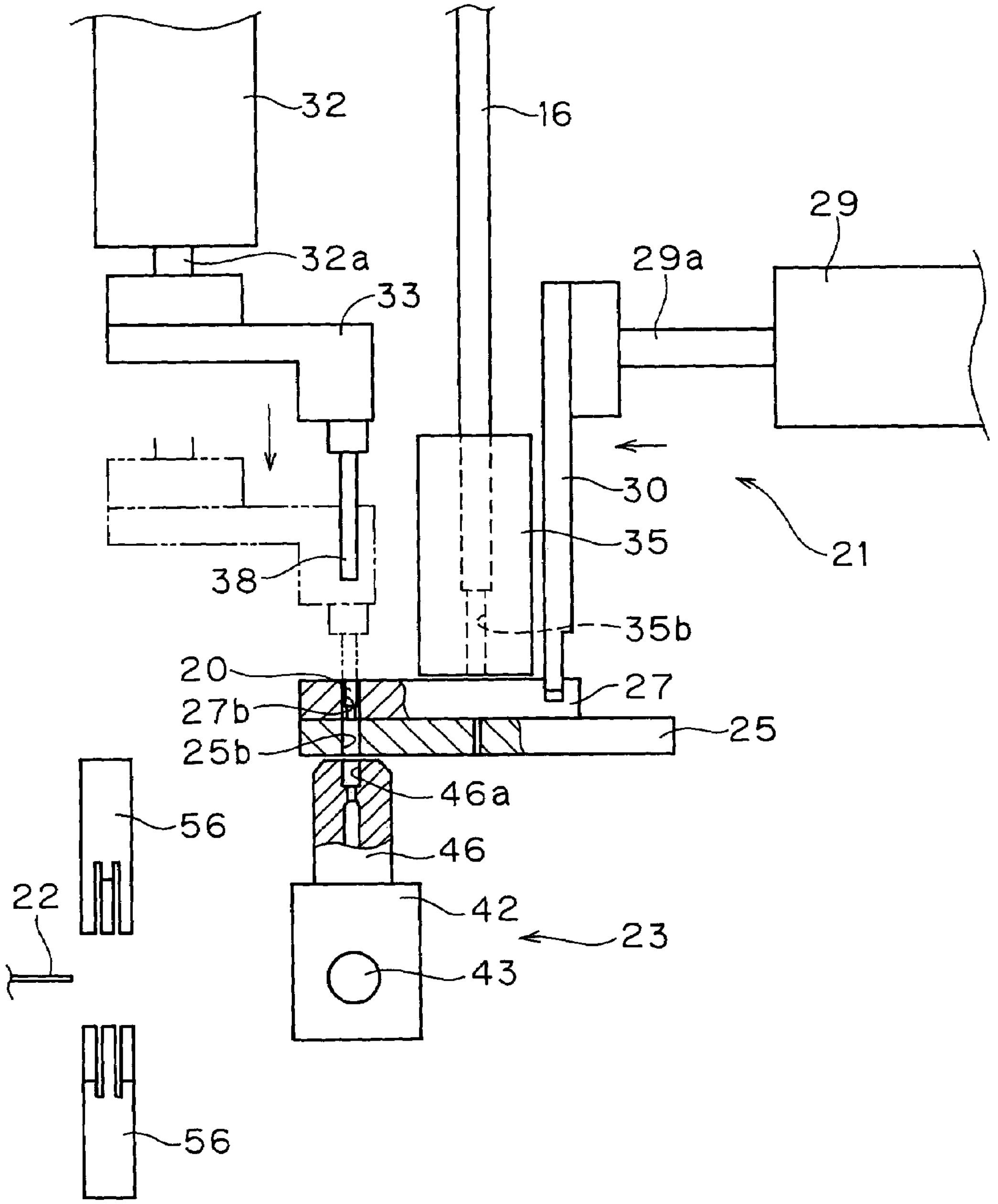

Subsequently, upon detection of the arrival of the waterproof seal 20 at the acceptance hole 27*b*, the cylinder rod 29*a* of the escape cylinder 29 moves forward, so that the slider board 27 is shifted to the transfer position as illustrated in FIG. 17. As a result of the shift of the slider board 27 to the transfer position, the acceptance holes 27*b*, the passage guiding holes 25*b* of the slider supporting board 25, and the seal acceptance recesses 46*a* of the seal holders 46 are vertically aligned.

Figure 18:
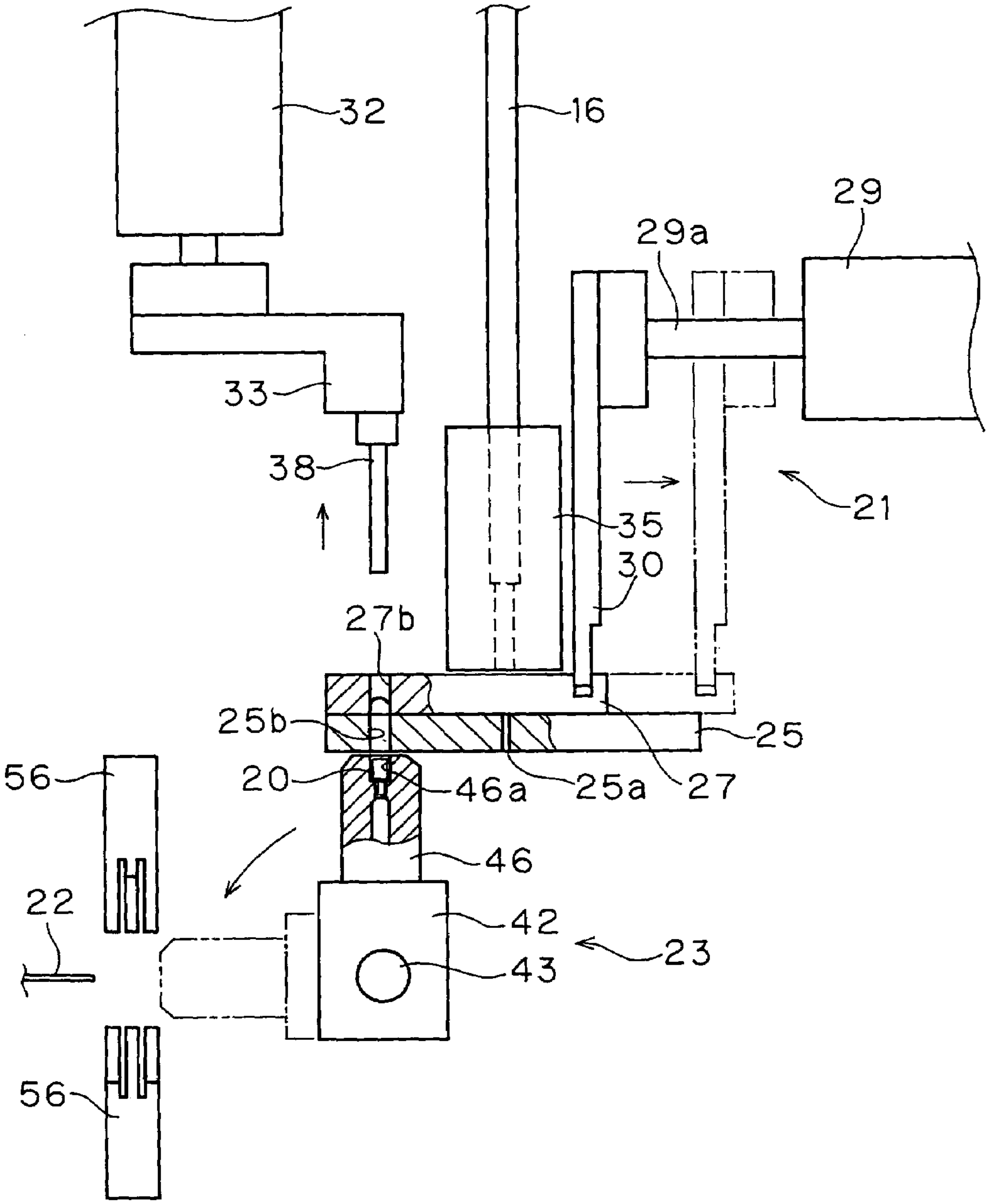

In the foregoing state, the cylinder rod 32*a* of the inserting cylinder 32 moves forward, to move downward the push pins 38, so that the waterproof seal 20 in the acceptance hole 27*b* is pushed out downward. When the cylinder rod 32*a* arrives at a predetermined position in the forward movement thereof, the cylinder rod 32*a* stops moving forward, and the waterproof seal 20 is fit in one of the seal acceptance recesses 46*a* through a corresponding one of the passage guiding holes 25*b*. Thereafter, the cylinder rod 32*a* is retracted to a position where the cylinder rod 32*a* was in the initial state, as illustrated in FIG. 18.

After the cylinder rod 32*a* is retracted, the cylinder rod 29*a* of the escape cylinder 29 also is retracted. The seal holder 46 in which the waterproof seal 20 is fit is pivoted on the supporting shaft 43 as a result of backward movement of the cylinder rod 48*a* of the swing cylinder 48, so that the seal holder 46 is turned 90 degrees and the position of the seal holder 46 is changed from the vertical position to the horizontal position, i.e., the electric-wire insertion position, as illustrated in FIG. 19.

Figure 19:
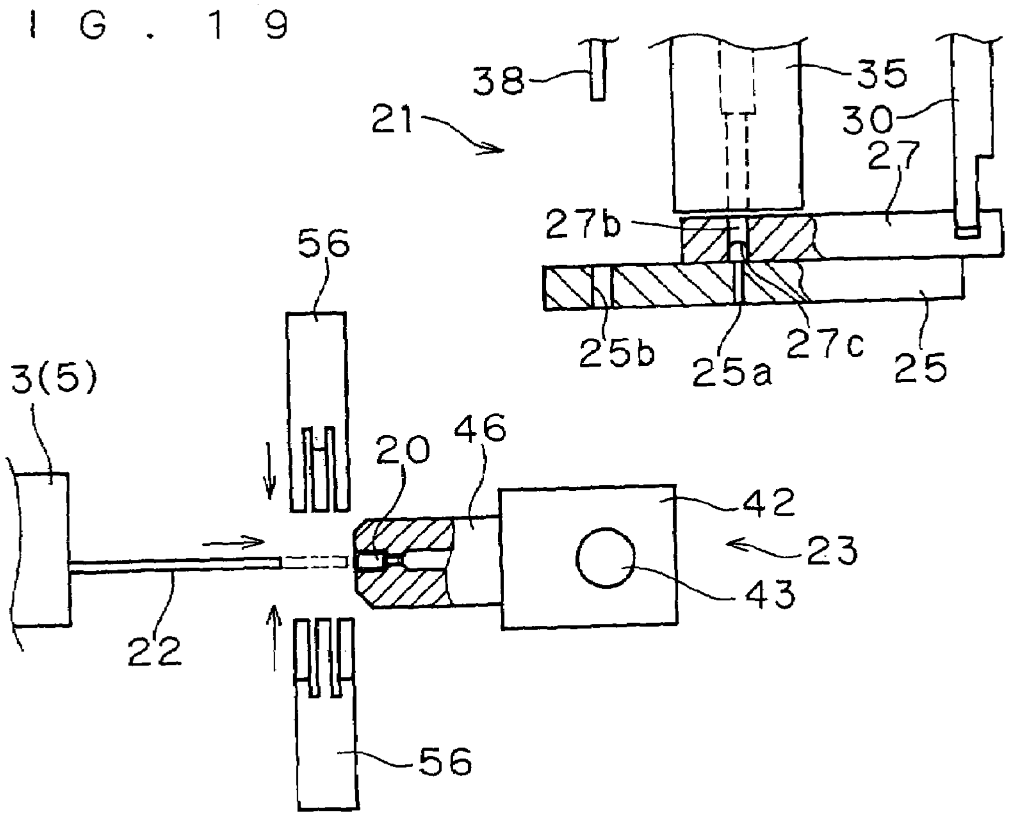
Figure 20:
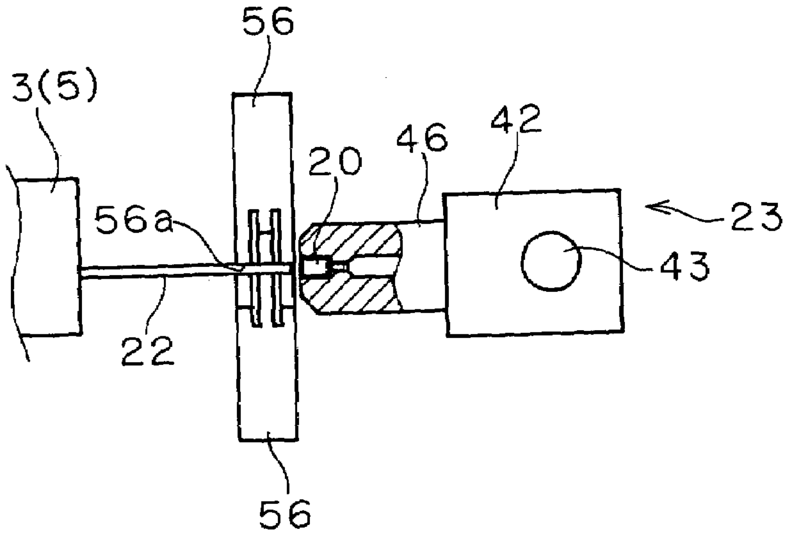

With the seal holder 46, as well as the waterproof seal 20, being in the electric-insertion position, an end portion of the electric wire 22 which has arrived and is standing by at the position where the seal-inserting station 7 or 10 is placed is extended by a predetermined length, as indicated by a broken line in FIG. 19. Then, the servo motor 59 is activated to bring each of the pairs of electric-wire guiding parts 56 into contact with each other (closing operation). The electric wire 22 is guided by the electric-wire guiding grooves 56*a* of one of the pairs of electric-wire guiding parts 56, which are being engaged with each other as illustrated in FIG. 20, so that an axis of the electric wire 22 and an axis of the waterproof seal 20 are horizontally aligned with each other.

Figure 21:
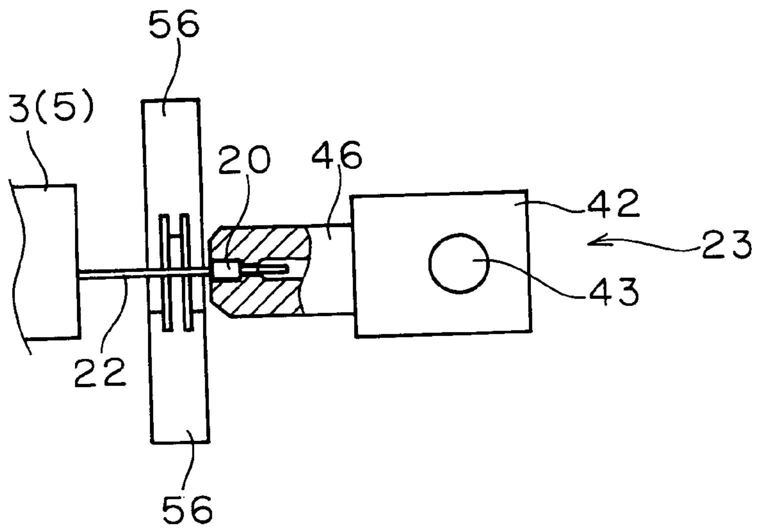

Thereafter, the electric wire 22 is further extended, and is guided by the electric-wire guiding grooves 56*a*, to be inserted into a hole formed by the waterproof seal 20 fit in the seal acceptance recess 46*a* of the seal holder 46, as illustrated in FIG. 21.

Figure 22:
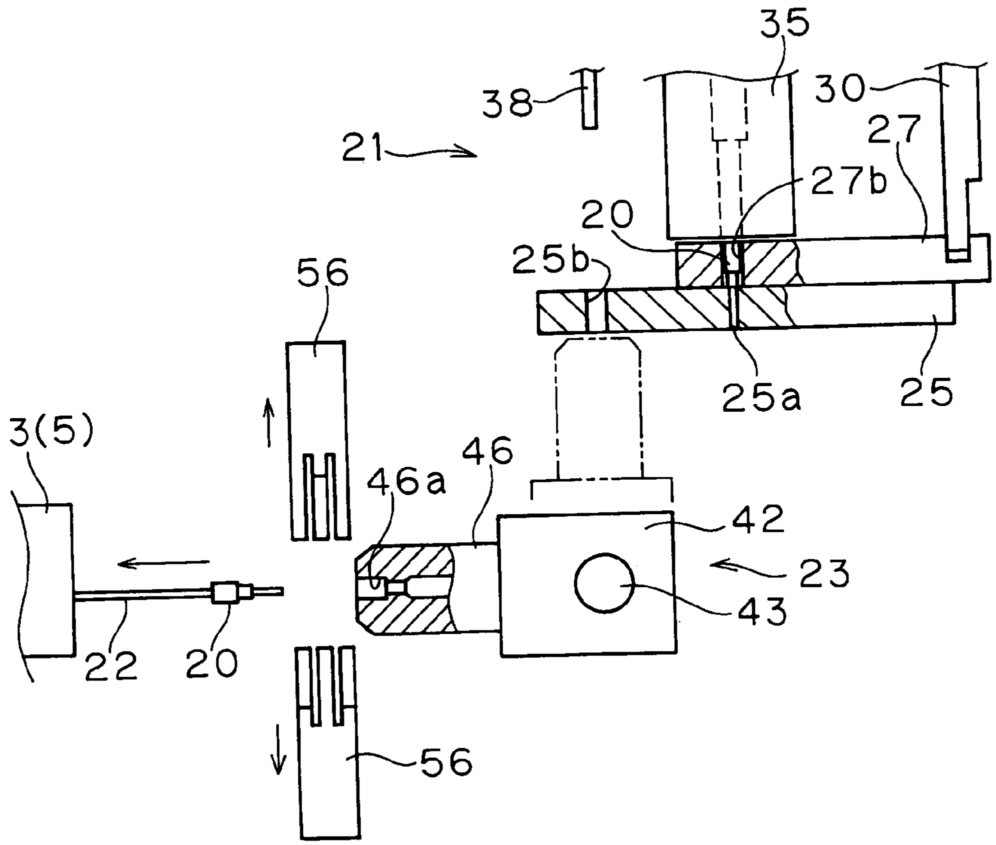

Subsequently, the servo motor 59 is again activated to bring each of the pairs of electric-wire guiding parts 56 out of contact with each other (opening operation), so that the electric-wire guiding parts 56 are returned to the initial state in which the electric-wire guiding parts 56 in each pair are vertically spaced from each other, as illustrated in FIG. 22. Thereafter, the electric wire 22 is drawn back to a position where the electric wire 22 was in the initial state. While the electric wire 22 is drawn back, also the waterproof seal 20 is drawn because of frictional resistance generated as a result of the end portion of the electric wire 22 having been inserted into and pressed into the hole formed by the waterproof seal 20. Thus, the waterproof seal 20 comes off the seal acceptance recess 46*a*, so that the waterproof seal 20 is applied to the end portion of the electric wire 22.

Then, after the electric wire 22 is drawn back, the cylinder rod 48*a* of the swing cylinder 48 moves forward, so that the seal holder 46 is returned back from the horizontal position to the vertical position, in other words, a position where the seal holder 46 was in the initial state.

In the meantime, the optical fiber sensors 37*a* and 37*b* detects non-arrival of the waterproof seal 20 via the detection path 27*c* of the slider board 27 which has been returned to the standby position. Upon generation of a signal indicative of the non-arrival of the waterproof seal 20, a next waterproof seal 20 is fed from the seal-feeding station 6 or 9 through the seal feeding tube 16. While the end portion of the electric wire 22 is inserted into the waterproof seal 20 which has been earlier fed and fit in the seal holder 46, the next waterproof seal 20 is supplied to the acceptance hole 27*b* of the slider board 27 and is standing by, as illustrated in FIG. 22.

As is made clear from the above description, according to the first preferred embodiment, while the end portion of the electric wire 22 is inserted into the waterproof seal 20 which has been earlier transferred to the seal holder 46 of the seal keeper 23 and the waterproof seal 20 is applied to the end portion of the electric wire 22, the next waterproof seal 20 can be fed from the seal-feeding station 6 or 9 to the acceptance hole 27*b* of the slider board 27 of the seal receiver 21 which is waiting in the standby position, through the seal feeding tube 16, to stand by. This makes it possible to promptly send the next waterproof seal 20 to a position where a next step is to be performed, to thereby improve a processing speed.

Also, in transferring the waterproof seal 20 fit in the acceptance hole 27*b* of the slider board 27 to the corresponding seal acceptance recess 46*a* of the seal holder 46 of the seal keeper 23, the waterproof seal 20 fit in the acceptance hole 27*b* is pushed out by the push pin 38 to be pressed into the corresponding seal acceptance recess 46*a*. Such process ensures that the waterproof seal 20 is pressed into a desired position in the seal acceptance recess 46*a*. Accordingly, the position where the waterproof seal 20 is to be located in the seal acceptance recess 46*a* is constant, so that the transfer of the waterproof seal 20 can be more reliably accomplished.

Further, the electric-wire guiding mechanism 55 includes the pairs of electric-wire guiding parts 56, each of which can be brought into and out of contact. Also, a source of driving forces for bringing each of the pairs of electric-wire guiding parts 56 into and out of contact includes the servo motor 59. Hence, a speed in bringing each of the pairs of electric-wire guiding parts 56 into and out of contact is improved, and also reliability in position control is improved. Also in this respect, the processing speed can be improved.

Moreover, the apparatus according to the first preferred embodiment includes the plurality of seal-feeding stations 6 and 9, the plurality of seal feeding tubes 16, the plurality of acceptance holes 27*b* of the slider board 27 in each of seal-inserting stations 7 and 10, and the plurality of push pins 38, the plurality of seal holders 46 including the seal acceptance recesses 46*a*, the plurality of pairs of electric-wire guiding parts 56, and the like. Hence, a change in type of the waterproof seal 20 can be addressed by appropriately selecting one of the seal holders 46 which conforms with each of various types of waterproof seals 20. Also, a change in the position where an end portion of the electric wire 22 is to stop can be easily addressed by changing a set position where the front moving member 12 or the rear moving member 13 is to stop. Thus, processes necessary for exchanging stages can be facilitated.

Additionally, the plurality of acceptance holes 27*b* are formed in the single slider board 27, to thereby allow the plurality of acceptance holes 27*b* to be moved by the single escape cylinder 29. This simplifies the whole structure.

Also, the plurality of push pins 38 are provided in the single pin holder 33, to thereby allow the plurality of push pins 38 to be moved by the single inserting cylinder 32. This simplifies the whole structure.

Also, the plurality of seal holders 46 are attached to the single holder supporting block 42, to thereby allow the plurality of seal holders 46 to be pivoted by the single swing cylinder 48. This simplifies the whole structure.

Also, the plurality of the upper electric-wire guiding parts 56 and the plurality of lower electric-wire guiding parts 56 in the pairs of electric-wire guiding parts 56 are secured to the pair of control blocks 57, respectively, to thereby allow the single servo motor 59 to perform the opening operation and the closing operation. This simplifies the whole structure.

It is additionally noted that though only the single slider board 27 is provided and the plurality of acceptance holes 27*b* are formed in common with one another in the slider board 27, a plurality of slider boards 27 may be provided so that the plurality of acceptance holes 27*b* are formed in the plurality of slider boards 27, respectively.

Figure 23:
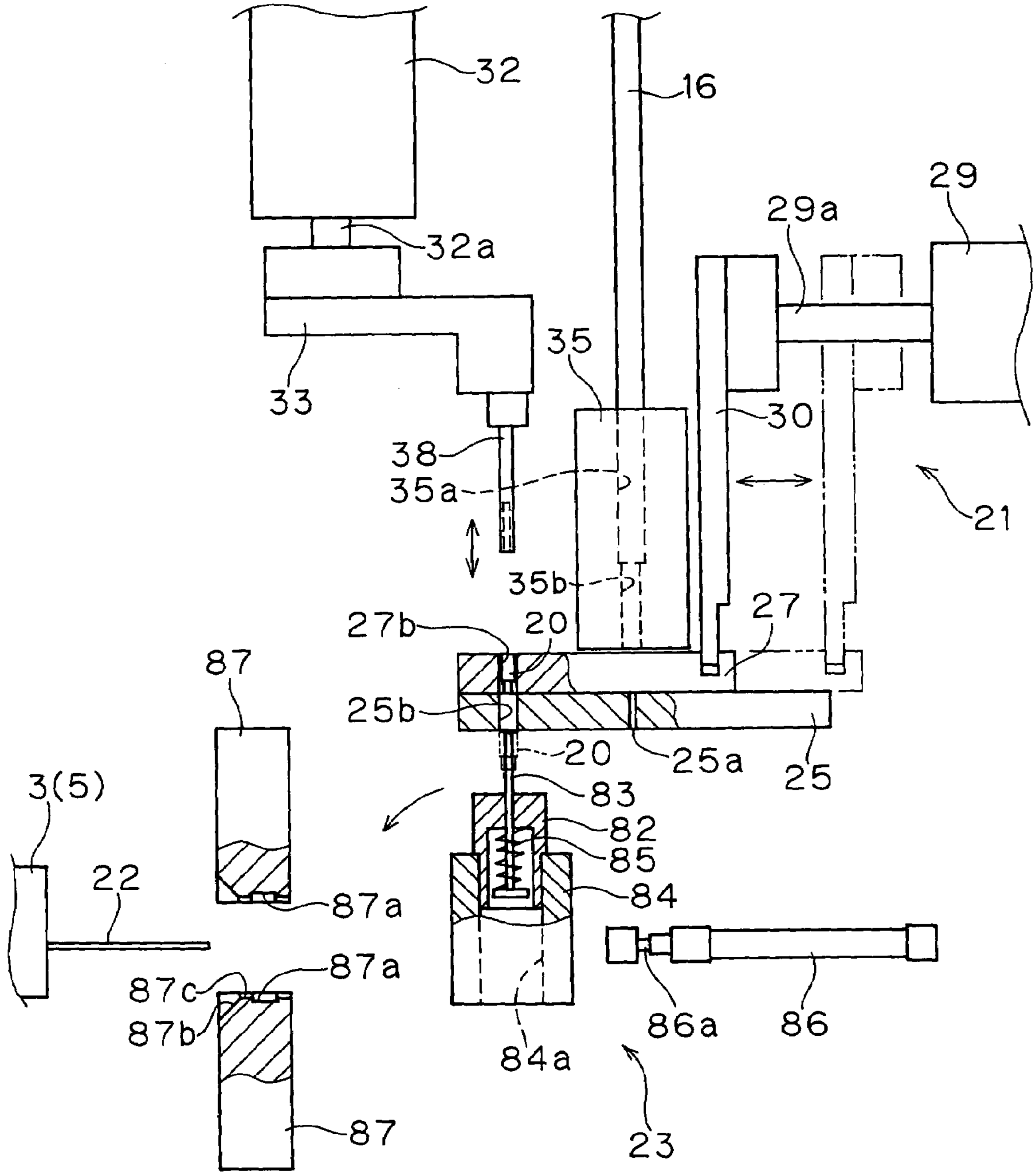
FIGS. 23, 24 and 25 illustrate processes for inserting an end portion of an electric wire into a waterproof seal according to a second preferred embodiment.
Figure 24:
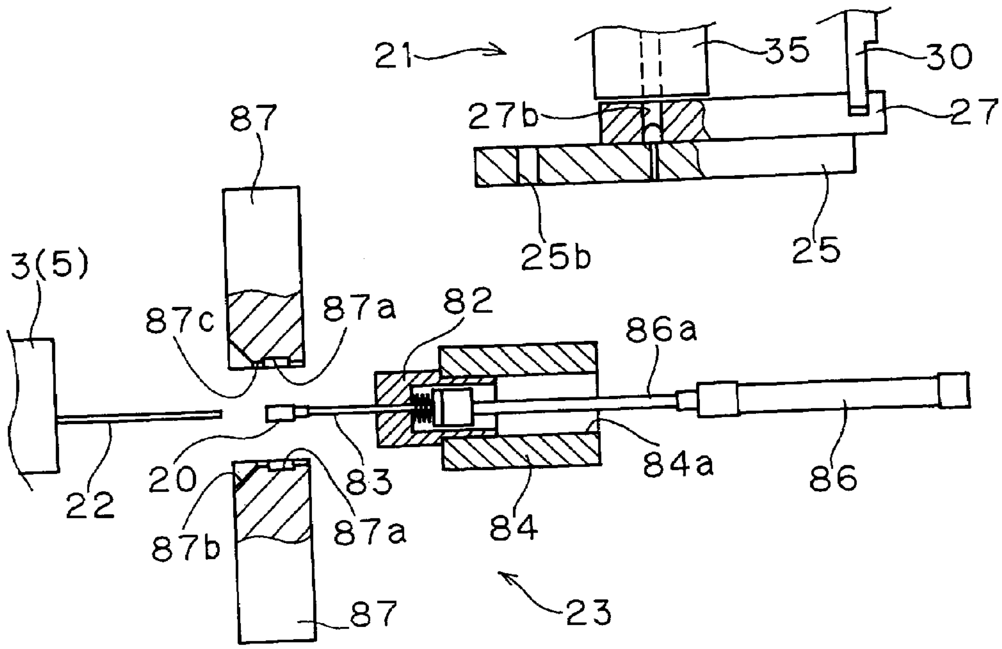
Figure 25:
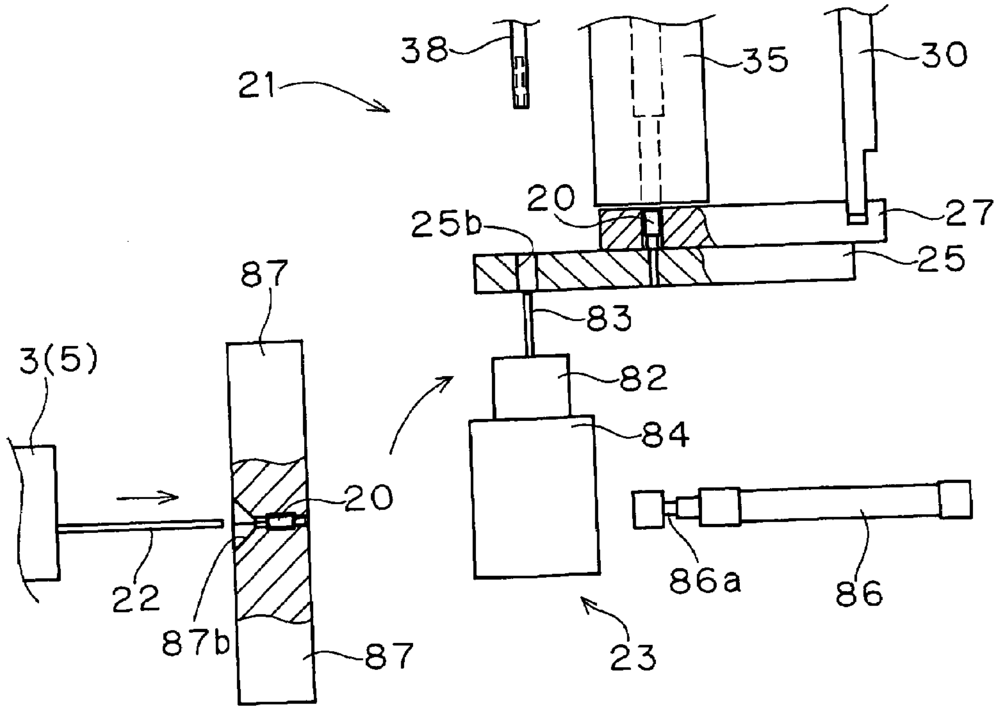

FIGS. 23, 24, and 25 illustrate a structure according to a second preferred embodiment. The same elements as in the structure according to the above-described first preferred embodiment are denoted by the same reference numerals, and detailed description thereof will be omitted.

According to the second preferred embodiment, a lower portion of each of the push pins 38 which are detachably provided in the pin holder 33 is in the shape of a cylinder corresponding to the shape of the waterproof seal 20. Each of the seal keepers 23 includes a seal relay holder 82 which includes a seal holding pin 83 which is inserted into the waterproof seal 20 pushed out from each of the acceptance holes 27*b* of the slider board 27 by a corresponding one of the push pins 38, to hold the waterproof seal 20.

Each of the seal relay holders 82 is detachably attached to a holder supporting block 84 which can be turned 90 degrees, like the holder supporting block 42. The seal holding pins 83 are movably supported by the seal relay holders 82, respectively. Each of the seal holding pins 83 is quickly urged to move forward and backward between two positions by a coil spring 85. In one of the two positions, the seal holding pin 83 protrudes from the seal relay holder 82 by a predetermined length as illustrated in FIGS. 23 and 25 ("initial protruding position"), and in the other position, the seal holding pin 83 is pushed by one of pushing cylinders 86 each including an air cylinder or the like, to further protrude from the seal relay holder 82 as illustrated in FIG. 24 ("pushed position"). The seal holding pin 83 is put in the initial protruding position when the seal holding pin 83 is retracted under influence of an elastic force of the coil spring 85, and the seal holding pin 83 is put in the pushed position when the seal holding pin 83 is pushed out against the elastic force of the coil spring 85 by the pushing cylinder 86. The initial protruding position and the pushed position of each of the seal holding pins 83 are controlled by a stopper appropriately provided.

Further, guide holes 84*a* through which respective cylinder rods 86*a* of the pushing cylinders 86 can move forward and backward are formed so as to face portions of the holder supporting block 84 in which the seal relay holders 82 are provided, respectively.

The guide holes 84*a* face the pushing cylinders 86 such that the pushing cylinders 86 can move forward and backward through the guide holes 84*a*, respectively, when the seal relay holders 82 are in the horizontal positions.

Then, when each of the seal relay holders 82 is in the vertical position ready for relaying the waterproof seal 20, axes of the seal holding pins 83, axes of the acceptance holes 27*b*, and axes of the passage guiding holes 25*b* are vertically aligned. Also, respective upper ends of the seal holding pins 83 are located just under the passage guiding holes 25*b*, respectively.

Additionally, shafts rotatably supported by the supporting frame 40 are provided at opposite side portions of the holder supporting block 84, and the geared link 49 is connected to the shafts.

According to the second preferred embodiment, each of the control blocks 57 includes a pair of seal holders 87 for receiving the waterproof seals 20 held by the seal holding pins 83, in place of the pairs of electric-wire guiding parts 56. The pair of seal holders 87 is detachably attached to each of the control blocks 57.

An acceptance recess 87*a* is formed in each of respective facing surfaces of the seal holders 87 in each pair. The waterproof seal 20 is fit in a hole formed by upper and lower acceptance recesses 87*a* of each of the pairs of seal holders 87 and is grasped by the upper and lower acceptance recesses 87*a*. Also, an electric-wire guiding groove is formed in a portion of each of the facing surfaces of the seal holders 87, which portion is located closer to the cramp 3 or 5 than the acceptance recess 87*a* and grasps the end portion of the electric wire 22. The electric-wire guiding groove forms an electric-wire guiding mechanism for guiding the electric wire 22 so that the electric wire 22 can be inserted into a hole formed by the waterproof seal 20 grasped by the upper and lower acceptance recesses 87*a*. The electric-wire guiding groove includes a tapered guiding surface 87*b* and an insertion guiding surface 87*c*. In a state where the seal holders 87 in each pair are in contact with each other, a diameter of a hole formed by two tapered guiding surfaces 87*b* in each of the pairs of seal holders 87 gradually decreases as a distance to the acceptance recess 87*a* decreases. Also, a diameter of a hole formed by two insertion guiding surfaces 87*c* in each of the pairs of seal holders 87 is a little bit larger than an outer diameter of the electric wire 22 which is to be inserted into the waterproof seal 20. In the other respects than described above, the structure according to the second preferred embodiment is identical to the structure according to the first preferred embodiment.

According to the second preferred embodiment, the initial state is identical to that according to the first preferred embodiment. Then, the waterproof seals 20 as targets of insertion are fed one by one from the seal-feeding stations 6 and 9 to the seal-inserting stations 7 and 10 through the seal feeding tubes 16 using feeding air. Upon detecting that one of the waterproof seals 20 is fit in one of the acceptance holes 27*b* of the slider board 27, the slider board 27 is shifted to the transfer position as illustrated in FIG. 23.

Then, when the push pins 38 are moved downward, the waterproof seal 20 fit in the acceptance hole 27*b* is pushed out downward through a corresponding one of the passage guiding holes 25*b*, so that a top end of one of the seal holding pins 83 is inserted into the waterproof seal 20 to hold the waterproof seal 20 as indicated by a broken line in FIG. 23. Thereafter, the push pins 38 are retracted to positions where the push pins 38 were in the initial state, and the slider board 27 also is returned to the standby position.

The seal holding pin 83 inserted into the waterproof seal 20 to hold the waterproof seal 20 is turned 90 degrees as a result of turning of the holder supporting block 84, so that the position of the seal holding pin 83 is changed from the vertical position to the horizontal position as illustrated in FIG. 24. With the seal holding pin 83, as well as the waterproof seal 20, being in the horizontal position, the cylinder rod 86*a* of a corresponding one of the pushing cylinders 86 moves forward by a predetermined distance, so that the seal holding pin 83 is put in the pushed position, in other words, the seal holding pin 83 protrudes from the seal relay holder 82 by a predetermined length.

In the foregoing state, the waterproof seal 20 and the upper and lower acceptance recesses 87*a* of one of the pairs of seal holders 87 are vertically aligned. Thus, the waterproof seal 20 is put in the electric-wire insertion position. Accordingly, the holder supporting block 84, the pushing cylinders 86 and the like construct a position changing mechanism for putting the waterproof seal 20 in the electric-wire insertion position.

Subsequently, the servo motor 59 is activated to bring the seal holders 87 in each pair into contact with each other (closing operation), so that the waterproof seal 20 is grasped and held by the upper and lower acceptance recesses 87*a*. Then, when the cylinder rod 86*a* of the pushing cylinder 86 is retracted, the seal holding pin 83 is pushed back under influence of the elastic force of the coil spring 85 which is being compressed, to be retracted into the seal relay holder 82, in other words, the seal holding pin 83 is put in the initial protruding position. In this manner, the waterproof seal 20 is transferred from the seal holding pin 83 to the seal holders 87.

After the waterproof seal 20 is transferred from the seal holding pin 83 to the seal holders 87, the seal holding pin 83 is returned from the horizontal position to the vertical position in the initial state as a result of turning of the holder supporting block 84 as illustrated in FIG. 25.

Thereafter, the electric wire 22 which has arrived and is standing by at the position where the seal-inserting station 7 or 10 is placed is extended toward the waterproof seal 20 held by the seal holders 87, and is guided toward a center of a hole formed by the waterproof seal 20 by the tapered guiding surfaces 87*b*, to be inserted into the hole formed by the waterproof seal 20 held by the seal holders 87 through the insertion guiding surfaces 87*c*.

Subsequently, the servo motor 59 is again activated to bring the seal holders 87 in each pair out of contact with each other (opening operation), so that the seal holders 87 are returned to the initial state in which the seal holders 87 in each pair are vertically spaced from each other, as illustrated in FIG. 23. Thereafter, the electric wire 22 is drawn back to a position where the electric wire 22 was in the initial state. Thus, the waterproof seal 20 is applied to the end portion of the electric wire 22.

In the meantime, the optical fiber sensors 37*a* and 37*b* detect non-arrival of the waterproof seal 20 via the detection path 27*c* of the slider board 27 which has been returned to the standby position. Upon generation of a signal indicative of the non-arrival of the waterproof seal 20, a next waterproof seal 20 is fed from the seal-feeding station 6 or 9 through the seal feeding tube 16. While the end portion of the electric wire 22 is inserted into the waterproof seal 20 which has been earlier fed and held by the seal holders 87, the next waterproof seal 20 is supplied to the acceptance hole 27*b* of the slider board 27 and is standing by, as illustrated in FIG. 25.

As is made clear from the above description, according to the second preferred embodiment, while the end portion of the electric wire 22 is inserted into the waterproof seal 20 which has been earlier fed and the waterproof seal 20 is applied to the end portion of the electric wire 22, the next waterproof seal 20 can be fed from the seal-feeding station 6 or 9 to the acceptance hole 27*b* of the slider board 27 of the seal receiver 21 which is waiting, in the standby position, through the seal feeding tube 16, to stand by, in the same manner as in the first preferred embodiment. This makes it possible to promptly send the waterproof seal 20 to a position where a next step is to be performed, to thereby improve a processing speed.

Also, in transferring the waterproof seal 20 fit in the acceptance hole 27*b* of the slider board 27 to the corresponding seal holding pin 83 of the seal keeper 23, the waterproof seal 20 fit in the acceptance hole 27*b* is pushed out by the push pin 38, to be pressed to the corresponding seal holding pin 83. Such process ensures that the waterproof seal 20 is pressed to a desired position in the seal holding pin 83. Accordingly, the position where the waterproof seal 20 is to be located on the seal holding pin 83 is constant, so that the transfer of the waterproof seal 20 can be more reliably accomplished.

Further, a source of driving forces for bringing the seal holders 87 in each pair into and out of contact includes the servo motor 59. This improves a speed in bringing the seal holders 87 into and out of contact, and reliability in position control. Also in this respect, the processing speed can be improved. Moreover, a change in type of the waterproof seal 20 can be addressed by appropriately selecting one of the pairs of the seal holders 87 which conforms with each of various types of waterproof seals 20. Also, a change in the position where an end portion of the electric wire 22 is to stop can be easily addressed by changing a set position where the front moving member 12 or the rear moving member 13 is to stop. Thus, processes necessary for exchanging stages can be facilitated.

Furthermore, since the waterproof seal 20 is grasped by the pair of seal holders 87, the waterproof seal 20 can be effectively held by the seal holders 87 to allow insertion of the electric wire 22 into the waterproof seal 20 even if a difference between the respective diameters of the terminal portion and the sealing portion of the waterproof seal 20 is small, in other words, a step in the waterproof seal 20 is extremely small.

Additionally, though the plurality of seal keepers 23 having the same structure are arranged side by side according to each of the first preferred embodiment and the second preferred embodiment described above, the seal keeper 23 having the structure according to the first preferred embodiment and the seal keeper 23 having the structure according to the second preferred embodiment may be mixed.

In a case where different kinds of seal keepers 23 are mixed, one of the seal keepers 23 which is optimal for each shape of various kinds of waterproof seals 20 can be employed, which increases user-friendliness.

Further additionally, though the electric-wire processing apparatus 1 for processing the single electric wire 22 has been described in the first and second preferred embodiment, the electric-wire processing apparatus 1 can process a plurality of electric wires 22 simultaneously.

While the invention has been shown and described in detail, the foregoing description is in all aspects illustrative and not restrictive. It is therefore understood that numerous modifications and variations can be devised without departing from the scope of the invention.

What is claimed is:

1. A waterproof-seal inserting apparatus for inserting an end portion of an electric wire into a tube-shaped waterproof seal, comprising:

a seal-feeding station; and a seal-inserting station, wherein said waterproof seal is fed from said seal-feeding station to said seal-inserting station through a seal feeding tube using feeding air, said seal-inserting station includes a seal receiver for receiving said waterproof seal fed through said seal feeding tube, and a seal keeper for keeping said waterproof seal transferred from said seal receiver in an electric-wire insertion position, and said seal receiver includes a slider board which is supported slidably between a standby position and a transfer position and includes an acceptance hole in which said waterproof seal fed through said seal feeding tube is fit when said slider board is in said standby position, and a push pin which is movable forward and backward, is located so as to face said acceptance hole of said slider board when said slider board is in said transfer position, and moves forward to push out said waterproof seal fit in said acceptance hole from said acceptance hole and transfer said waterproof seal to said seal keeper.

2. The waterproof-seal inserting apparatus according to claim 1, wherein said seal keeper includes:

a seal holder including a seal acceptance recess in which said waterproof seal pushed out from said acceptance hole by said push pin is fit;

a position changing mechanism for moving said seal holder to put said waterproof seal fit in said seal holder in said electric-wire insertion position; and an electric-wire guiding mechanism for guiding said end portion of said electric wire so that said end portion of said electric wire is inserted into said waterproof seal put in said electric-wire insertion position.

3. The waterproof-seal inserting apparatus according to claim 2, wherein said electric-wire guiding mechanism includes a pair of electric-wire guiding parts which are brought into and out of contact, and a source of driving forces for bringing said pair of electric-wire guiding parts into and out of contact includes a servo motor.

4. The waterproof-seal inserting apparatus according to claim 3, wherein said waterproof-seal inserting apparatus includes a plurality of seal-feeding stations which include said seal-feeding station and include the same structure as said seal-feeding station, a plurality of seal feeding tubes which include said seal feeding tube and include the same structure as said seal feeding tube, and a plurality of said seal-inserting stations which include said seal-inserting station and include the same structure as said seal-inserting station.

5. The waterproof-seal inserting apparatus according to claim 4, wherein said seal keeper of each of said plurality of seal-inserting stations includes a plurality of seal keepers including, a first seal keeper comprising:

a seal holder including a seal acceptance recess in which said waterproof seal pushed out from said acceptance hole by said push pin is fit;

a first position changing mechanism for moving said seal holder to put said waterproof seal fit in said seal holder in said electric-wire insertion position; and a first electric-wire guiding mechanism for guiding said end portion of said electric wire so that said end portion of said electric wire is inserted into said waterproof seal put in said electric-wire insertion position, and a second seal keeper comprising:

a seal holding pin which is inserted into said waterproof seal pushed out from said acceptance hole by said push pin, to hold said waterproof seal;

a second position changing mechanism for moving said seal holding pin to move said waterproof seal held by said seal holding pin;

a seal holder for grasping opposite side portions of said waterproof seal moved by said second position changing mechanism to hold said waterproof seal in said electric-wire insertion position, and receiving said waterproof seal from said seal holding pin; and a second electric-wire guiding mechanism for guiding said end portion of said electric wire so that said end portion of said electric wire is inserted into said waterproof seal put in said electric-wire insertion position.

6. The waterproof-seal inserting apparatus according to claim 2, wherein said waterproof-seal inserting apparatus includes a plurality of seal-feeding stations which include said seal-feeding station and include the same structure as said seal-feeding station, a plurality of seal feeding tubes which include said seal feeding tube and include the same structure as said seal feeding tube, and a plurality of said seal-inserting stations which include said seal-inserting station and include the same structure as said seal-inserting station.

7. The waterproof-seal inserting apparatus according to claim 6, wherein said seal keeper of each of said plurality of seal-inserting stations includes a plurality of seal keepers including, a first seal keeper comprising:

a seal holder including a seal acceptance recess in which said waterproof seal pushed out from said acceptance hole by said push pin is fit;

a first position changing mechanism for moving said seal holder to put said waterproof seal fit in said seal holder in said electric-wire insertion position; and a first electric-wire guiding mechanism for guiding said end portion of said electric wire so that said end portion of said electric wire is inserted into said waterproof seal put in said electric-wire insertion position, and a second seal keeper comprising:

a seal holding pin which is inserted into said waterproof seal pushed out from said acceptance hole by said push pin, to hold said waterproof seal;

a second position changing mechanism for moving said seal holding pin to move said waterproof seal held by said seal holding pin;

a seal holder for grasping opposite side portions of said waterproof seal moved by said second position changing mechanism to hold said waterproof seal in said electric-wire insertion position, and receiving said waterproof seal from said seal holding pin; and a second electric-wire guiding mechanism for guiding said end portion of said electric wire so that said end portion of said electric wire is inserted into said waterproof seal put in said electric-wire insertion position.

8. The waterproof-seal inserting apparatus according to claim 1, wherein said seal keeper includes:

a seal holding pin which is inserted into said waterproof seal pushed out from said acceptance hole by said push pin, to hold said waterproof seal;

a position changing mechanism for moving said seal holding pin to move said waterproof seal held by said seal holding pin;

a seal holder for grasping opposite side portions of said waterproof seal moved by said position changing mechanism to hold said waterproof seal in said electric-wire insertion position, and receiving said waterproof seal from said seal holding pin; and an electric-wire guiding mechanism for guiding said end portion of said electric wire so that said end portion of said electric wire is inserted into said waterproof seal put in said electric-wire insertion position.

9. The waterproof-seal inserting apparatus according to claim 8, wherein said electric-wire guiding mechanism includes a pair of electric-wire guiding arts which are brought into and out of contact, and a source of driving forces for bringing said pair of electric-wire guiding parts into and out of contact includes a servo motor.

10. The waterproof-seal inserting apparatus according to claim 9, wherein said waterproof-seal inserting apparatus includes a plurality of seal-feeding stations which include said seal-feeding station and include the same structure as said seal-feeding station, a plurality of seal feeding tubes which include said seal feeding tube and include the same structure as said seal feeding tube, and a plurality of said seal-inserting stations which include said seal-inserting station and include the same structure as said seal-inserting station.

11. The waterproof-seal inserting apparatus according to claim 10, wherein said seal keeper of each of said plurality of seal-inserting stations includes a plurality of seal keepers including, a first seal keeper comprising:

a seal holder including a seal acceptance recess in which said waterproof seal pushed out from said acceptance hole by said push pin is fit;

a first position changing mechanism for moving said seal holder to put said waterproof seal fit in said seal holder in said electric-wire insertion position; and a first electric-wire guiding mechanism for guiding said end portion of said electric wire so that said end portion of said electric wire is inserted into said waterproof seal put in said electric-wire insertion position, and a second seal keeper comprising:

a seal holding pin which is inserted into said waterproof seal pushed out from said acceptance hole by said push pin, to hold said waterproof seal;

a second position changing mechanism for moving said seal holding pin to move said waterproof seal held by said seal holding pin;

a seal holder for grasping opposite side portions of said waterproof seal moved by said second position changing mechanism to hold said waterproof seal in said electric-wire insertion position, and receiving said waterproof seal from said seal holding pin; and a second electric-wire guiding mechanism for guiding said end portion of said electric wire so that said end portion of said electric wire is inserted into said waterproof seal put in said electric-wire insertion position.

12. The waterproof-seal inserting apparatus according to claim 8, wherein said waterproof-seal inserting apparatus includes a plurality of seal-feeding stations which include said seal-feeding station and include the same structure as said seal-feeding station, a plurality of seal feeding tubes which include said seal feeding tube and include the same structure as said seal feeding tube, and a plurality of said seal-inserting stations which include said seal-inserting station and include the same structure as said seal-inserting station.

13. The waterproof-seal inserting apparatus according to claim 12, wherein said seal keeper of each of said plurality of seal-inserting stations includes a plurality of seal keepers including, a first seal keeper comprising:

a seal holder including a seal acceptance recess in which said waterproof seal pushed out from said acceptance hole by said push pin is fit;

a first position changing mechanism for moving said seal holder to put said waterproof seal fit in said seal holder in said electric-wire insertion position; and a first electric-wire guiding mechanism for guiding said end portion of said electric wire so that said end portion of said electric wire is inserted into said waterproof seal put in said electric-wire insertion position, and a second seal keeper comprising:

a seal holding pin which is inserted into said waterproof seal pushed out from said acceptance hole by said push pin, to hold said waterproof seal;

a second position changing mechanism for moving said seal holding pin to move said waterproof seal held by said seal holding pin;

a seal holder for grasping opposite side portions of said waterproof seal moved by said second position changing mechanism to hold said waterproof seal in said electric-wire insertion position, and receiving said waterproof seal from said seal holding pin; and a second electric-wire guiding mechanism for guiding said end portion of said electric wire so that said end portion of said electric wire is inserted into said waterproof seal put in said electric-wire insertion position.

14. The waterproof-seal inserting apparatus according to claim 1, wherein said waterproof-seal inserting apparatus includes a plurality of seal-feeding stations which include said seal-feeding station and include the same structure as said seal-feeding station, a plurality of seal feeding tubes which include said seal feeding tube and include the same structure as said seal feeding tube, and a plurality of said seal-inserting stations which include said seal-inserting station and include the same structure as said seal-inserting station.

15. The waterproof-seal inserting apparatus according to claim 14, wherein said seal keeper of each of said plurality of seal-inserting stations includes a plurality of seal keepers including, a first seal keeper comprising:

a seal holder including a seal acceptance recess in which said waterproof seal pushed out from said acceptance hole by said push pin is fit;

a first position changing mechanism for moving said seal holder to put said waterproof seal fit in said seal holder in said electric-wire insertion position; and a first electric-wire guiding mechanism for guiding said end portion of said electric wire so that said end portion of said electric wire is inserted into said waterproof seal put in said electric-wire insertion position, and a second seal keeper comprising:

a seal holding pin which is inserted into said waterproof seal pushed out from said acceptance hole by said push pin, to hold said waterproof seal;

a second position changing mechanism for moving said seal holding pin to move said waterproof seal held by said seal holding pin;

a seal holder for grasping opposite side portions of said waterproof seal moved by said second position changing mechanism to hold said waterproof seal in said electric-wire insertion position, and receiving said waterproof seal from said seal holding pin; and a second electric-wire guiding mechanism for guiding said end portion of said electric wire so that said end portion of said electric wire is inserted into said waterproof seal put in said electric-wire insertion position.

* * * * *